United States Patent
Chang

(10) Patent No.: US 7,515,594 B2
(45) Date of Patent: Apr. 7, 2009

(54) ENHANCED VIRTUAL CIRCUIT ALLOCATION METHODS AND SYSTEMS FOR MULTI-STAGE SWITCHING ELEMENTS

(75) Inventor: Ho-Yen Chang, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 663 days.

(21) Appl. No.: 11/182,242

(22) Filed: Jul. 15, 2005

(65) Prior Publication Data

US 2007/0014299 A1   Jan. 18, 2007

(51) Int. Cl.
*H04L 12/56* (2006.01)
(52) U.S. Cl. .................. 370/397; 370/389; 370/392; 370/399
(58) Field of Classification Search .............. None
See application file for complete search history.

(56) References Cited

U.S. PATENT DOCUMENTS

| | | | | |
|---|---|---|---|---|
| 6,069,895 A | * | 5/2000 | Ayandeh | 370/399 |
| 6,304,639 B1 | * | 10/2001 | Malomsoky et al. | 379/112.04 |
| 6,345,050 B1 | * | 2/2002 | Alleyne et al. | 370/389 |
| 7,336,658 B2 | * | 2/2008 | Chang et al. | 370/388 |
| 2003/0074468 A1 | | 4/2003 | Chang et al. | |

* cited by examiner

*Primary Examiner*—Daniel J Ryman
*Assistant Examiner*—Tito Pham

(57) ABSTRACT

A system and method for routing data, which includes a switching node, including a plurality of switching elements and plurality of links coupled to the switching elements for providing a routing path for the data; and a virtual circuit identification algorithm in communication with the switching node for providing an even distribution of data traffic through the switching node, wherein the virtual circuit identification algorithm determines a path selection formula.

8 Claims, 16 Drawing Sheets

Fig. 1c

| INPUT PORT (iport) | INPUT VCI (ivci) | OUTPUT PORT (oport) | OUTPUT VCI (ovci) |
|---|---|---|---|
| 0 | 0 | 0 | 0 |
| 0 | 1 | 0 | 1 |
| 0 | 2 | 0 | 2 |
| ⋮ | ⋮ | ⋮ | ⋮ |
| 0 | 127 | 7 | 127 |
| 1 | 0 | 1 | 0 |
| 1 | 1 | 1 | 1 |
| 1 | 2 | 1 | 2 |
| ⋮ | ⋮ | ⋮ | ⋮ |
| 1 | 127 | 6 | 127 |
| 2 | 0 | 2 | 0 |
| ⋮ | ⋮ | ⋮ | ⋮ |
| 2 | 127 | 5 | 127 |
| ⋮ | ⋮ | ⋮ | ⋮ |
| 7 | 127 | 0 | 127 |
| ⋮ | ⋮ | ⋮ | ⋮ |

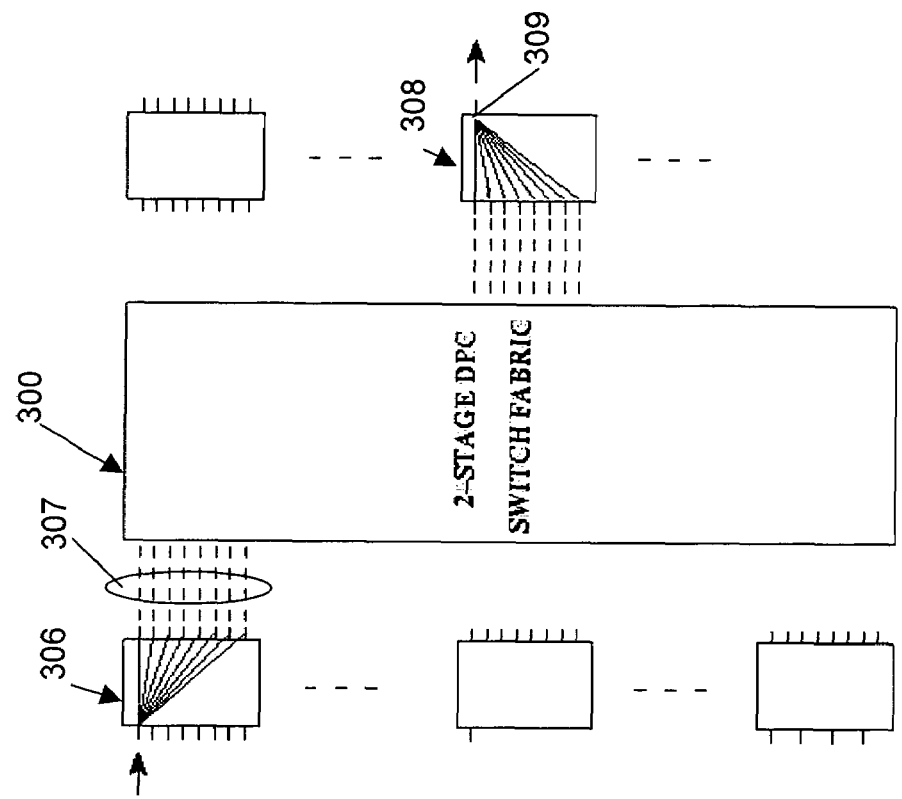
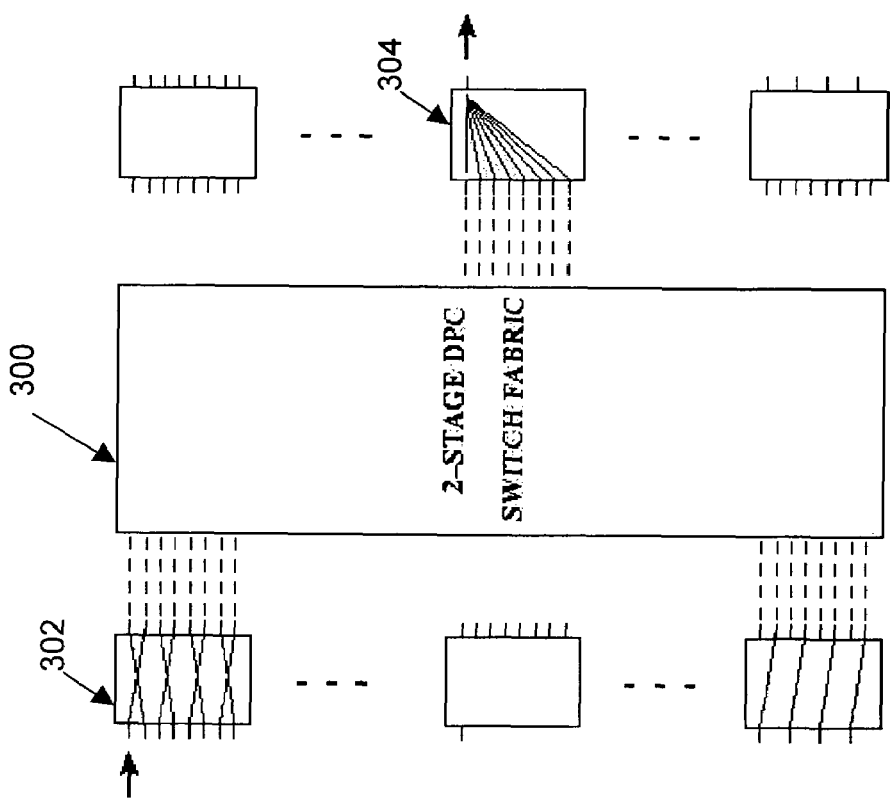
Fig. 3b
Fig. 3a

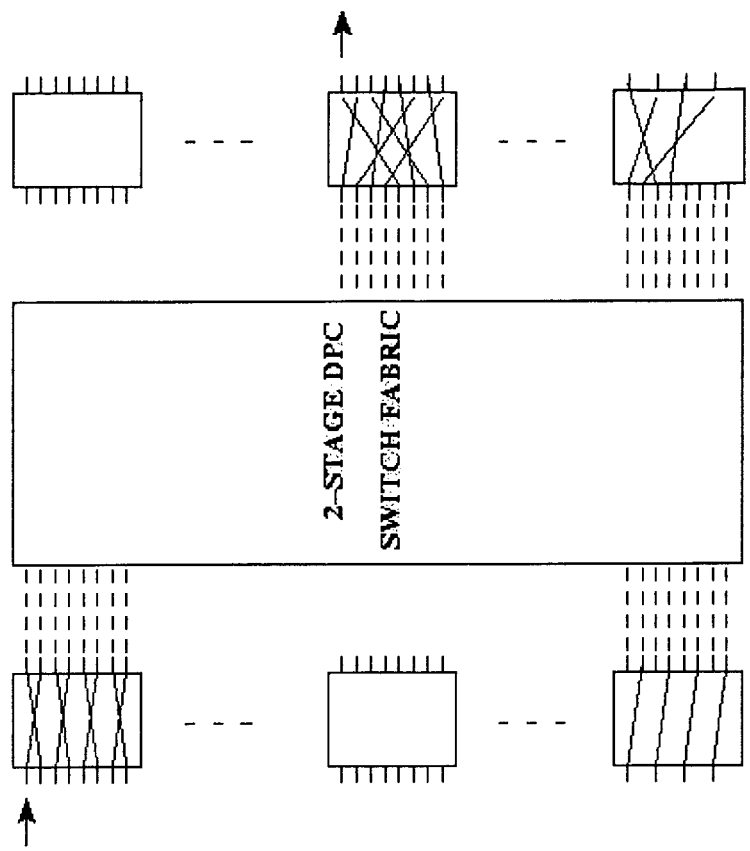
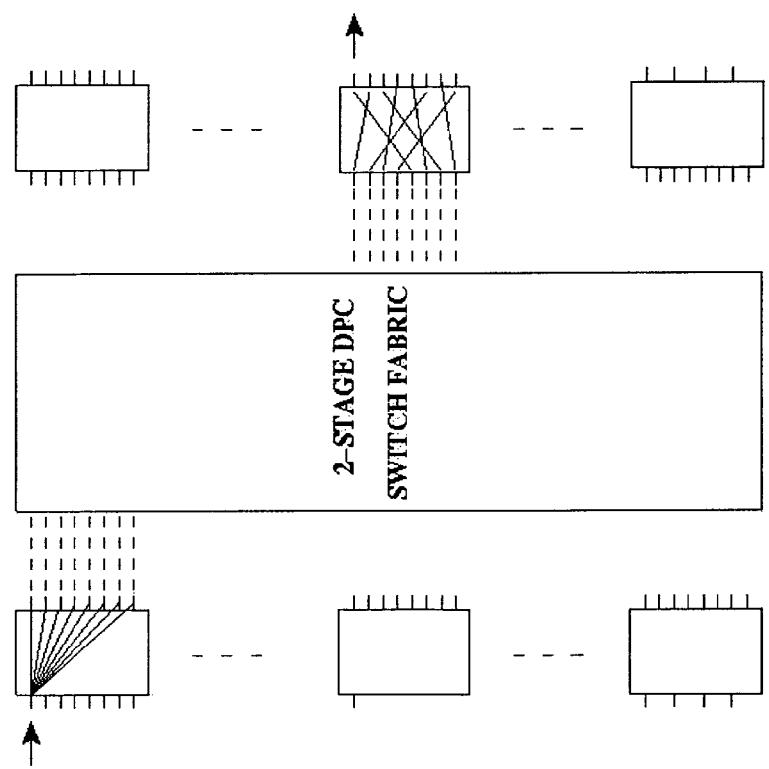

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |  gfc  |      vpi      |            vci            |O|F|E|C|
   +-+-+-+-+-+-+-+-+-+-+-+-+-+-+-+-+-+-+-+-+-+-+-+-+-+-+-+-+-+-+-+-+

O: oam
   F: efci
   E: eom
   C: clp
```

Fig. 10

ENHANCED VIRTUAL CIRCUIT ALLOCATION METHODS AND SYSTEMS FOR MULTI-STAGE SWITCHING ELEMENTS

CROSS REFERENCE TO RELATED APPLICATIONS

This application is related to application Ser. No. 10/033,039 entitled "Methods and System Virtual Circuit Identification based on BIT Permutation of link numbers for multi-stage elements" filed on Jan. 2, 2002, which claims the benefit of provisional application No. 60/271,973, entitled "VCI ALLOCATING SCHEME BASED ON BIT PERMUTATION OF LINK NUMBERS FOR MULTI-STAGE ELEMENTS" by Ho-Yen Chang, Tyan-Shu Jou, Ritesh Ahuja, and James da Silva, filed on Feb. 28, 2001. The entireties of both applications are incorporated herein by reference.

TECHNICAL FIELD

The present invention relates generally to a data networks and, more specifically, to the assigning of circuit pathways between nodes of a data network. Still more specifically, the invention relates to a virtual circuit identification (VCI) allocation scheme based on bit permutations of link numbers for multi-stage switching elements.

BACKGROUND

Data networks use an assortment of switches, routers and traffic links to distribute the transmission of data. Many modern network switches and routers employ interconnection network consisting of multi-staged ATM (asynchronous transfer mode) switching elements (in a switch fabric) to provide fast speed and high bandwidth data transmission capabilities. Each switching element has multiple input and output ports, and a data path controller (DPC) with a configured switch lookup table. When an encapsulated packet arrive on a given input port, the switching element does a table lookup by using the packet header information to decide on which of its output port this packet should be sent out. To increases the number of input/output ports needed by a router system, a switch fabric layout consists of multiple switching elements in several stages, which are interconnected by physical links or buses. Under a physical link, the data packet can utilize multiple virtual circuit paths by putting different virtual circuit identification (VCI) in its encapsulated ATM header.

A challenge in developing such systems is to assign the virtual circuit paths, or the virtual circuit identification (VCI) mapping to each switching element's lookup table to maximize the utilization and throughput of the interconnection network and to satisfy any specific traffic pattern requirements for the network overall. For example, a traffic path conflict may occur within an interconnection network. Such conflicts can occur when input traffic from two different input source ports uses the same physical link on one data path controller (DPC) to two different output destination ports. A conflict means that these two traffic paths, even for different input and output port pairs, cannot be utilized simultaneously to provide full bandwidth because of the contention on the same physical link in the switch fabric.

In one known router configuration, the router has 128 input ports that act as points of "ingress" and 128 output ports that act as points of "egress" of the router. From the ingress side to the egress side of the router, the distribution of the data paths is often allocated such that the data is transmitted unevenly and so that the data traffic will heavier on certain virtual paths. This often results in a bottleneck of the data within the router. Compounding this problem is the inclusion of switching elements with varying data transmission speeds. In addition, these switching elements may require that data be split into various multiple paths for proper operation.

For example, with many modern-day router system architectures, data is routed using an allocation scheme that supports a single-port high-speed board communicating with a multiple-port low-speed board. Thus, data traffic arrived from all the ports of the low speed board may be aggregated into the single-port high-speed board by multiple paths in parallel without conflicts. Similarly, traffic arrived from a high-speed port may be de-aggregated into multiple ports of a given low speed board. Furthermore, to support communications between two high-speed switching elements, the traffic may have to be split evenly into smaller multiple paths (or "stripes") and sent to multiple ports in a first stage. Through multiple non-conflict paths, which are pre-allocated in the interconnection network, traffic must then be aggregated in a last stage to a desired output port. Dividing and reassembling the data into the required multiple paths for the various boards can lead to conflicts in the routing of the data that can result in severe congestion and packet lose.

Therefore, what is needed is a method to design the system in which traffic between source and destination ports is evenly transmitted through multi-staged switching elements in the switch fabric, and no conflict arises during the paths of the transmitted data.

SUMMARY

The present invention provides a method and system for a VCI allocation scheme based on bit representations and bit permutations of link numbers. This scheme may be expanded to any multi-stage ATM switch fabric used in an interconnection network, with varying numbers of stages and varying physical layouts.

According to one embodiment, disclosed is a method of assigning paths through an interconnection network consisting of a plurality of switching elements and a plurality of links coupling the switching elements. The method comprises the step of using physical restrictions of the interconnection network to arrive at a logical representation of the architecture of the interconnection network in the switch fabric. Next, traffic patterns of the interconnection network are determined to balance the data traffic through the plurality of links coupling the switching elements. The logical representation and traffic patterns of the interconnection network are used to setup virtual channel identifiers that determine paths through the switching elements and links so that data traffic is more evenly distributed through the interconnection network.

Certain aspects of this invention provide a new "path selection formula" that sets up the VCI lookup table in each ATM switch element (DPC, data path controller), and assigns each traffic cell a VCI path while it travels through different DPCs on different stages.

Certain aspects of this invention provide the enhancement on the previous art such that no contention should happen on the bidirectional traffic path between any two ports through the switch fabric to provide full-duplex performance on the interfaces, which previous solution was suffering. In addition, traffic should be balanced among all possible paths to guarantee all DPCs have equal opportunity to be utilized.

Certain aspects of this invention provide the path selection formulas for both 3-stage and 4-stage switch fabrics.

According to one embodiment, the method includes the steps of mapping the interconnection network with a virtual circuit identifier and using the virtual circuit identifier to assign a path for data through the interconnection network from an input port to an output port.

According to another embodiment, the method of assigning paths through an interconnection network comprises the step of mapping the interconnection network to a table of virtual circuit identifiers wherein the virtual circuit identifiers include the physical restrictions and traffic patters of the interconnection network. Next, the virtual identifiers are used to assign a path for data through the interconnection network from an input port to an output port of the interconnection network. In one embodiment, the physical restrictions within the virtual circuit identifiers are based on the speed of the switching elements in the interconnection network. In another embodiment, the physical restrictions include the number of states of the interconnection network. Still other embodiments include virtual circuit identifiers where physical restrictions are based on the number of switching elements in each stage of the interconnection network, the number of ports for each switching element in the interconnection network, the number of links each input port and each output port in the interconnection network, and the physical link layout between each input port and each output port in the interconnection network.

The invention provides numerous advantages including the even distribution of data traffic as it traverses the interconnection network.

Another advantage of the invention is support of switching elements of various port speeds, with data traffic more evenly distributed as data is aggregated or de-aggregated to accommodate both high and low speed ports.

BRIEF DESCRIPTION OF THE DRAWINGS

Other aspects of the invention, including its advantages and specific embodiments, are understood by reference to the following detailed description in conjunction with the appended drawings in which:

FIG. 1c illustrates an example architecture of a virtual circuit identification (VCI) table corresponding to a switch in the interconnection network in FIG. 1a;

FIGS. 3a-3d illustrate different traffic pattern requirements for the interconnection network of FIGS. 1a and 1b;

FIG. 10 illustrates an exemplary 4-byte ATM header which could be employed in a fabric cell format;

FIG. 11 illustrates a process for populating first and last stage table entries for the exemplary 4 stage interconnection network of FIG. 1a;

FIG. 12 illustrates a process for populating the first and second middle stage table entries for the exemplary 4 stage interconnection network of FIG. 1a;

References in the detailed description correspond to like references in the figures unless otherwise indicated.

DETAILED DESCRIPTION

For the purposes of the present disclosure, various acronyms are used, and the definitions of which are listed below:

| Acronym | Definition |
| --- | --- |
| ATM | Asynchronous Transfer Mode |
| clp | Congestion Loss Priority |
| DP | Data Path |
| DPC | Data Path Controller |
| dpcnum | DPC Number |
| dst | Destination |
| efci | Explicit Forward Congestion Indication |
| eom | End of Message |
| FS | First Stage |
| gfc | Generic Flow Control |
| ilink | Input link |
| IP | Internet Protocol |
| iport | Input port |
| ivci | Input VCI number |
| LS | Last Stage |
| Ms1 | First Middle Stage |
| Ms2 | Second Middle Stage |
| Oam | Operation, Administration, and Maintenance |
| olink | Output link |
| oport | Output port |
| ovci | Output VCI number |
| Portnum | Port Number |
| QoS | Quality of Service |
| VCI | Virtual Circuit Identification |
| VPI | Virtual Path Identification |

While the making and using of various embodiments of the present invention are discussed in detail below, it should be appreciated that the present invention provides many applicable inventive concepts that can be embodied in a wide variety of specific contexts. For example, while the invention is described in connection with a switching network consisting of four stages and three stages, it should be understood that the invention may be practiced with any multi-stage switching network with differing numbers of stages and various configurations.

Figure 1A:
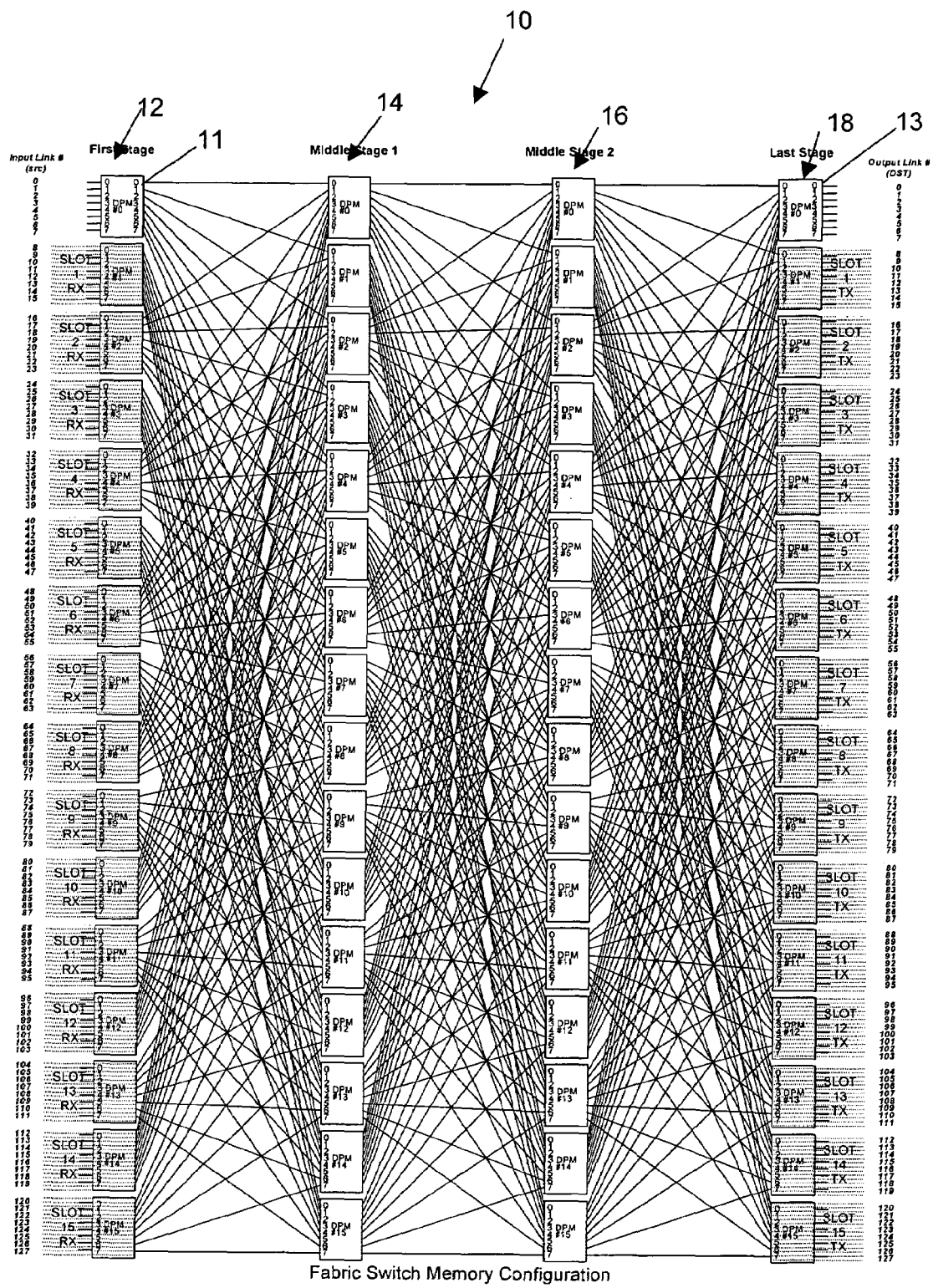
FIG. 1a illustrate the physical layout of a four stage interconnection network of a switch fabric in which certain aspects of the invention can be employed.

FIG. 1a is a graphic representation of an illustrative embodiment of a four-stage fabric switch or network 10 which may be used in a network node such as an IP router. The network 10 is representative of switching elements in a data communications network, such as, for example, an ATM network or router. For this reason, the interconnection network 10 can be thought of as a "switching network" in function, and the terms shall be used interchangeably throughout. As will be explained in detail later, this exemplary network 10 comprises 64 ATM switching elements arranged in four columns. Each column contains 16 switching elements and represents one stage. There are four stages: A, B, C, and D. Thus, the first column 12, comprising 16 switch elements, represents a first stage or, in this example, stage A. In this illustrative embodiment, the first switch element in the column 12 is labeled DPM #0. The second switch element in column 12 is labeled DPM #1. The third switch element in the column 12 is labeled DPM #2, etc. The last switch element in column 12 is labeled DPM #15. The second column 14 represents a first middle stage or stage B group of 16 switch elements which are also labeled DPM #0 through DPM #15. Similarly, the third column 16 represents a second middle stage (stage C) group of 16switch elements, and the fourth column 18 represents the last stage or stage D group of 16 switch elements. In some embodiments, the ATM switching elements may be a data path controller (DPC). The main components of a switching element are a pair of elements called a data path (DP) and a DPC.

Figure 1B:
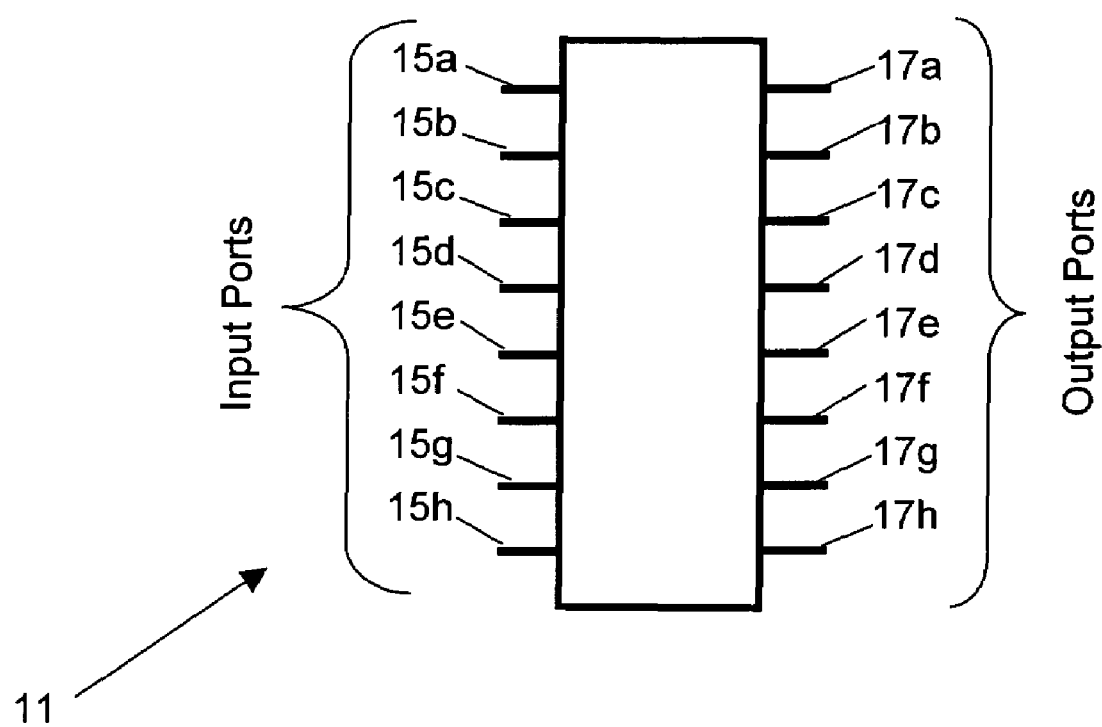
FIG. 1b illustrate the physical layout of an exemplary switching element.

FIG. 1b is a detailed illustration of an exemplary switching element, such as switching element 11. As illustrated, each switching element supports eight input ports 15a through 15h and eight output ports 17a through 17h, as shown in FIG. 1b. Packets encapsulated in an ATM cell coming from an input port will exit the switching element via an output port. As discussed below, packets may enter the switch fabric via the input ports on column 12 which will be destined to one output port of column 18 (destination) via four DPCs (one DPC in each column or stage) of the 64 DPC shown in the switch fabric or network 10.

As stated above, interconnection switching network 10 consists of four stages A-D of 16 switching elements as shown in FIG. 1a. In this example, all switching elements with an even number DPC label in stage A (e.g., DPC #0, 2, 4, 6, 8, 10, 12, 14)—are connected to the top half of the sixteen switching elements in stage B (e.g., DPC #0, 1, 2, 3, 4, 5, 6, and 7 in column 14) and all switching elements with an odd number in stage A (e.g., DPC#1, 3, 5, 7, 9, 11, 13, 15) are connected to the bottom half of the sixteen switch elements in stage B (e.g., DPC# 8, 9, 10, 11, 12, 13, 14,15 in column 14). Furthermore, all switching elements with an even number DPC label in stage B (e.g., DPC #0, 2, 4, 6, 8, 10, 12, 14 in column 14) are connected to the top half of the sixteen switch elements in stage C (e.g., DPC #0, 1, 2, 3, 4, 5, 6, and 7 in column 16). The switching elements with an odd number in stage B (e.g., DPC#1, 3, 5, 7, 9, 11, 13, 15 of column 14) are connected to the bottom half of the sixteen switch elements in stage C (e.g., DPC# 8, 9, 10, 11, 12, 13, 14, 15 in column 16).

In a similar manner, the switching elements with an even number DPC label in stage C (e.g., DPC #0, 2, 4, 6, 8, 10, 12, 14 in column 16) are connected to the top half of the sixteen switch elements in stage D (e.g., DPC #0, 1, 2, 3, 4, 5, 6, and 7 in column 18). The switching elements with an odd number in stage C (e.g., DPC#1, 3, 5, 7, 9, 11, 13, 15 of column 16) are connected to the bottom half of the sixteen switch elements in stage D (e.g., DPC# 8, 9, 10, 11, 12, 13, 14, 15 in column 18).

The collection of destination points of the interconnection network 10 is also referred to as the "egress" side of the interconnection network 10. Likewise, the input ports of stage A from the "ingress" side of the board in which the interconnection network 10 is implemented. DP and DPC pairs of stage A and last stage D, are on switching elements and stages B and C pairs are on the interconnection network 10.

In this embodiment, each DPC contains a virtual circuit identification (VCI) lookup table of size 8192 entries, or 1024 entries per input port for an 8-port board. FIG. 1c illustrates the architecture of such a VCI table in a DPC corresponding to the interconnection network 10 of FIG. 1a. In this example, a 13 bit index (0 to 8191) of the VCI table is a concatenation of a three bit internal port number (0 to 7) and a least significant ten bits of an incoming VCI number (0 to 1023). Therefore, at least 1024 VCIs may be supported for each input port 15a-15h as shown in FIG. 1b. Note that, for this system architecture, 1024 (i.e., 8×128) entries may be enough for each DPC to support any combination of input ports (8 of them) and destination links (128 of links). Other VCI paths can be used for different QoS classes of traffic.

In this embodiment, at least 1024 VCIs can be supported for each input port. The ATM traffic cell coming from an input port of a DPC (with the input VCI of its ATM header) will be sent out on a new output port with replaced VCI value in its ATM header, based in part on the VCI lookup table for that DPC. That is, based on the VCI number of the ATM cell header, the input port number and the lookup table, the DPC can decide which static path pre-allocated will be used to deliver each traffic cell. Thus, the algorithms described later relates to setting up the VCI lookup table to allocate fully mesh VCI paths statically between any two input and output ports.

The interconnection arrangement shown in FIGS. 1a and 1b is only an example and other interconnection configurations may be used. For example, the even numbered switching elements of one stage may be linked to the bottom switching elements of the subsequent stage or the even number switching elements may be linked to only odd numbered switching elements of the subsequent stage.

Figure 1D:
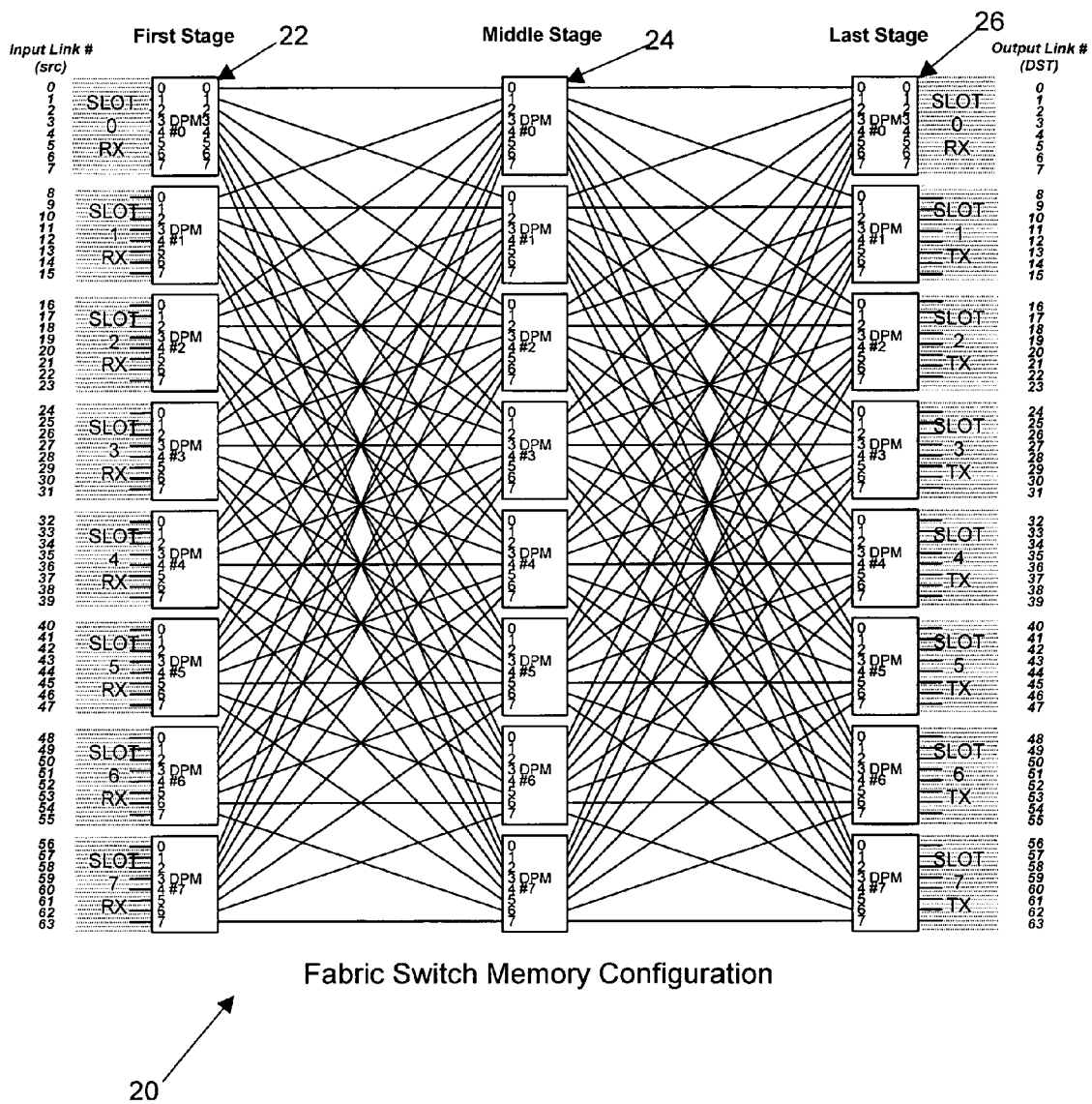
FIG. 1d illustrates the physical layout of a three stage interconnection network of a switch fabric in which certain aspects of the invention can be employed.

FIG. 1d represents a graphic representation of another illustrative embodiment of a three-stage fabric switch or network 20 which may be used in a network node such as an IP router. In this example embodiment, the network 20 comprises 24 ATM switching elements arranged in three columns. The first column 22 of switch elements represents a first stage or, in this example, stage A. The second column 24 represents a middle stage or stage B. The third column 26 represents the last stage or stage C.

It will be understood that the diagrams shown and described in FIGS. 1a, 1b, 1c and 1d are intended to be representative of the data routing systems in which the invention can be utilized and not a particular physical structure to which the invention is limited.

Figure 2:
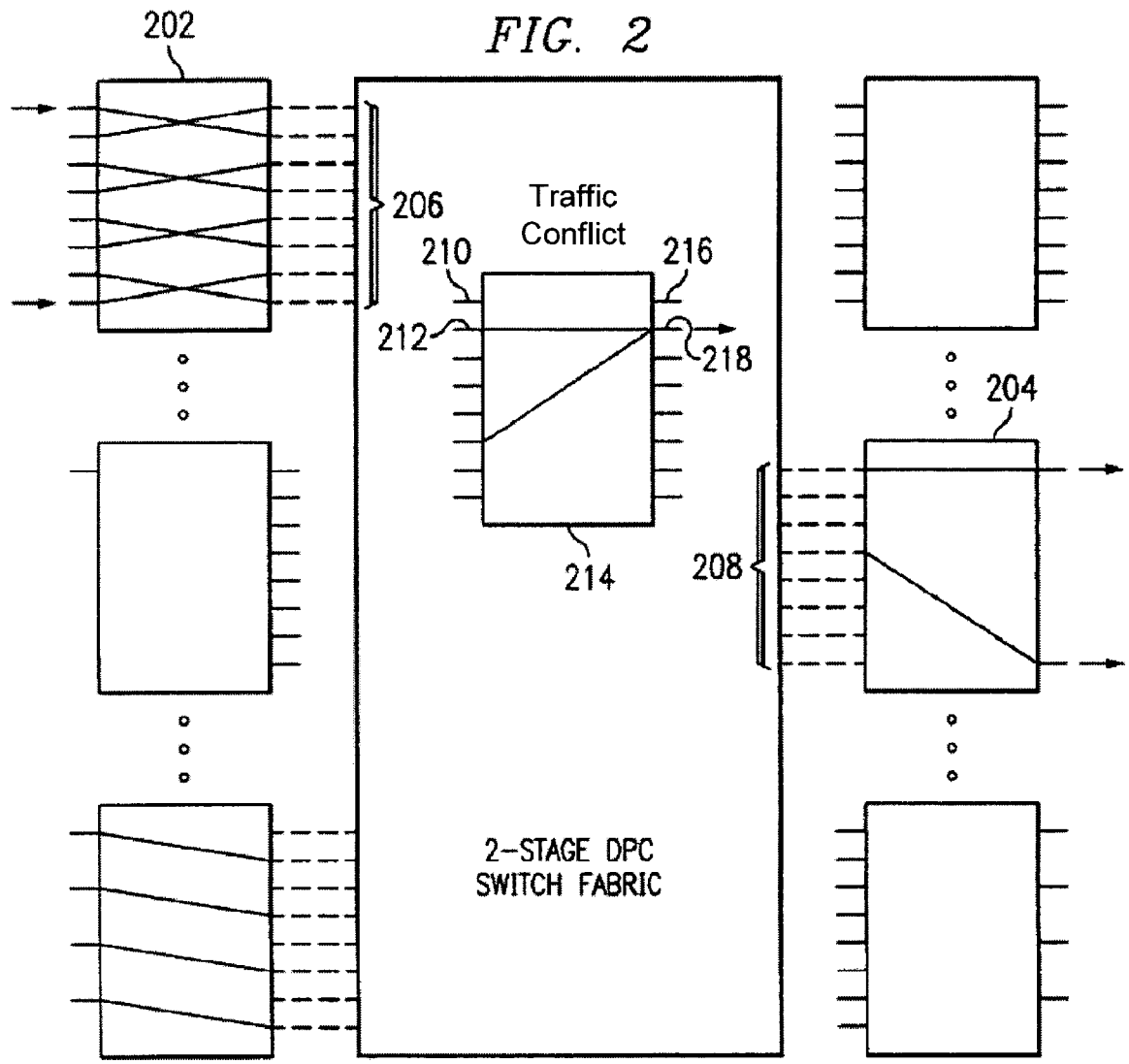
FIG. 2 illustrates a path conflict within an interconnection network.

Having described the configuration of an interconnection network 10 or network 20 as well as the switching elements and links coupling the switching elements, reference is now made to FIG. 2 which illustrates a path conflict within interconnection network 10 of FIGS. 1a, and 1b. A fundamental goal of VCI allocation is to ensure that there exists at least as many distinct paths from any one switching element in a first stage to any switching element in a last stage such that every input port of the switching element at a given slot in the interconnection network can reach any output port of the switching element at a given slot in the interconnection network. For example, as shown in FIGS. 1a and 1b, there exists at least eight distinct paths from a switching element in stage A to a switching element in stage D such that every input into the switching element in stage A can reach every output out of the switching element in stage D. Thus, if a data traffic pattern is a permutation of input ports to output ports between, for example, switching elements 202 and 204, paths 206 and 208 may be used to transmit the data traffic at full speed. In addition, the data traffic may be transmitted in parallel if no other data traffic is being transmitted at the same time on a specific path.

As noted above, conflicts may occur when data traffic from input source ports, such as input ports 210 and 212, attempt to use the same physical path through switching element 214 to output destination ports, such as output ports 216 and 218. A conflict implies that data traffic inputs at ports 210 and 212 cannot use the same physical path simultaneously and maintain full bandwidth of the data routing system. The present invention provides a method and system of avoiding such conflicts while maintaining the bandwidth capabilities of the system used to route data. The method can be referred to as a VCI allocation algorithm while the system takes the form of a data routing system that includes the VCI allocation algorithm of the invention.

FIGS. 3a through 3d illustrate different traffic pattern requirements in the example interconnection network where the switching elements can support both high speed and low speed ports. FIG. 3a graphically represents a two stage switch fabric or network 300. It can be seen that the VCI allocation algorithm of the present invention supports a situation where a single output port on a high speed switching element 304 can provide the required speed to support a low speed multi-port switching element 302. A multi-port switching element 302 typically consists of two, four, six, or eight ports, although other configurations are possible. Therefore, traffic from the multiple ports of the low speed switching element 302 in the first stage may be aggregated into a single high speed switching 304 element in parallel without conflicts.

Turning now to FIG. 3b, which illustrates a situation which supports communications between high speed switching elements. In this situation, traffic flows between the two high-speed interfaces boards 306 and 308 (with one port each). In this example, the traffic is split evenly into smaller stripes 307 and sent to multiple ports in the first stage. Through multiple non-conflict paths which were pre-allocated in the fabric, traffic can then be aggregated in the last stage to the desired output port 309. In other words, by the use of multiple non-conflict paths which may be preallocated in the interconnection network, data traffic can then be aggregated in a last stage to a desired output port. Thus, traffic from high speed switching element 306 may be deaggregated for input into switching element 308.

FIG. 3c, as shown, illustrates the situation that a high-speed switching element can de-aggregate the input traffic from a single input port to different output ports of a low-speed egress switch element.

FIG. 3d illustrates normal traffic between two low-speed boards with unique path. The different input ports on an switch elements can communicate with different output ports of another switching element at full speed in parallel, as long as the combination pairs of input and output ports are different.

The present invention provides methods and a system for evenly distributing data traffic across an interconnection network such as interconnection network 10, using the full bandwidth of the interconnection network without suffering from the conflict of the data paths when being transmitted from an input point to an output point. Switching elements of differing speeds may be used and still avoid the problem of conflicts and congestion at certain points within the interconnection network experienced by prior art systems. In this regard, the present invention uses the physical restrictions of the interconnection network and logical representations of the interconnection network to setup virtual channel identifiers that determine paths through the switching elements and links connecting the switching elements. These VCIs are used to evenly distribute data traffic throughout the interconnection network.

In addition, as illustrated in FIGS. 3a through 3d, the interconnection network may be made up of switching elements of varying speeds, which may include low speed switching elements and high speed switching elements. From a low speed switching element to a high speed switching element, data traffic may be aggregated from multiple inputs into a single output. From a high speed switching element to a low speed switching element, data traffic may be deaggregated from a single input into multiple outputs. From a high speed switching element to another high speed switching element, data traffic may be striped. From a low speed switching element to another low speed switching element, data traffic may be transmitted without any aggregation, deaggregation or striping involved. The networks and system of the present invention support all these traffic patterns in order to balance traffic through the interconnection network.

As noted previously, each switching element has an input side, and an output side and each side may contain a plurality of ports. The interconnection network is connected so that an output port of the switching element in a first stage is connected to an input port in a second stage. In addition, a link number which couples the switching elements may be represented by using, for example, seven bits. The first four bits of the seven bits may identify a number associated with a particular switching element and the three remaining bits may identify a port number for the switching element. Thus, an input source link number (consisting of the input switching element and the port of the switching element) may be designated with, for example, seven bits and the output destination link number (consisting of the output switching element and the port of the switching element) may be also designated with, for example, seven bits. For each input/output link pair, a VCI mapping entry at a specific stage may be represented by:

| | |
|---|---|
| input: switching element # | input port - input VCI |
| output: switching element # | output port - output VCI |

The architecture of the interconnection network may include some guidelines on the virtual circuit identifier allocation algorithm. Recall in the discussion referring to FIG. 1a and 1b, the even switching elements of each stage are connected to the top half of the switching elements in the next stage and the odd switching elements of each stage are connected to the bottom half of the switching elements in the next stage. Therefore, in this example, some preliminary guidelines may be needed to evenly distribute the data traffic across the interconnection network.

Referring back to FIG. 1a, these guidelines may include the following:

For the input side of switching element, an even/odd bit of a switching element number associated with switching element in stage A equals a top/bottom bit of a switching element number associated with switching element in stage B. In addition, the remaining bits in the switching element number associated with switching element 11 in stage A equals the bits of an input port number associated with switching element 118 in stage B. Moreover, the bits of the output port of switching element 11 in stage A equals the remaining bits of the switching element number associated with switching element 118 stage B. Finally, the output VCI number for switching element 11 in stage A equals the input VCI number of switching element 118 in stage B.

Figure 4:
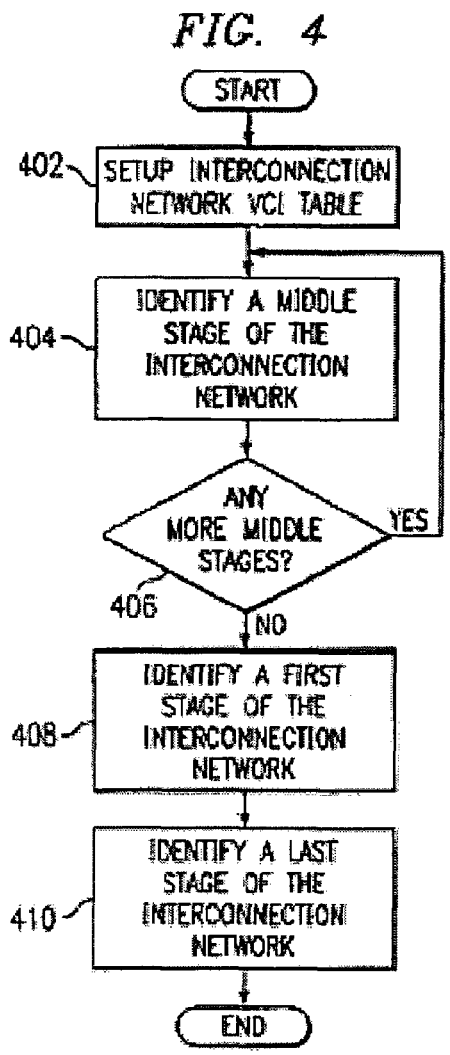
FIG. 4 is an exemplary flowchart illustrating a multi-stage VCI setup in accordance with the present invention.

Turning now to FIG. 4, there is illustrated an exemplary flowchart illustrating a method of multi-stage VCI setup in accordance with the present invention. In this example, the operation begins by setting up the interconnection network virtual circuit identifier (step 402). Then the middle stages of the interconnection network are identified in which a virtual circuit identifier is established (step 404). The switching element interconnection virtual circuit identifier is then set up (step 406). The first stage of the interconnection network is identified in which a virtual circuit identifier is established (step 408) and a last stage of the interconnection network is identified in which a virtual circuit identifier is established (step 410).

Figure 5:
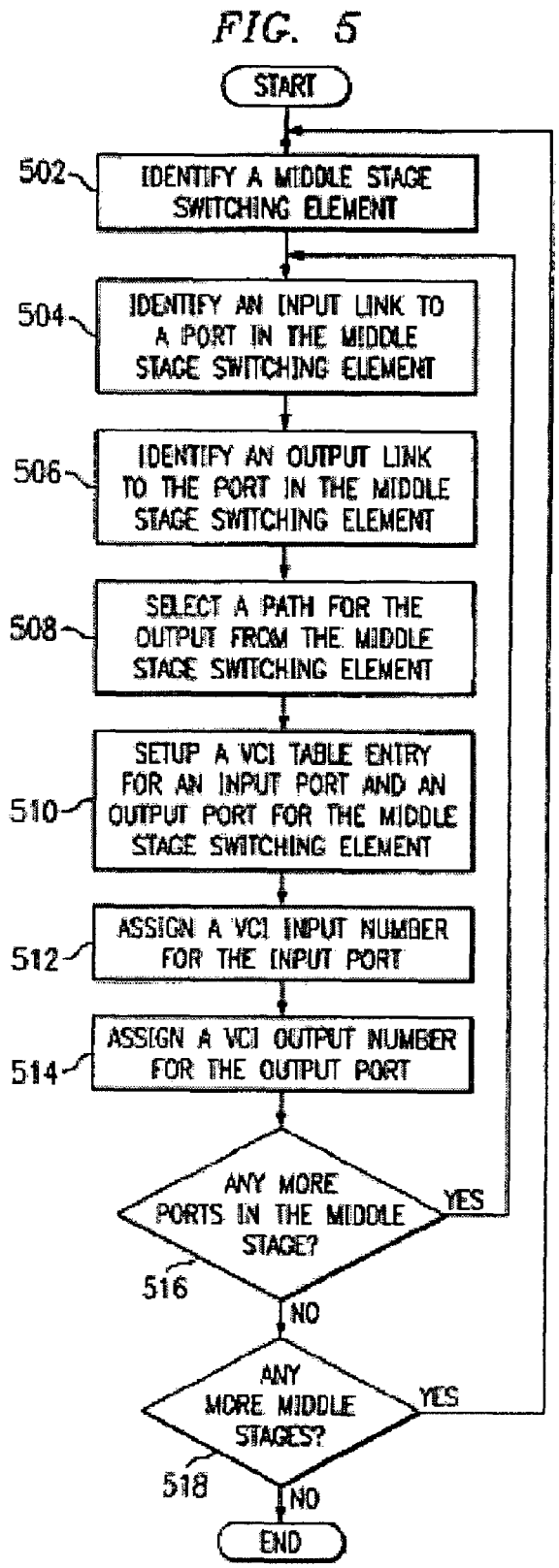
FIG. 5 is an exemplary flowchart illustrating the VCI set up for a middle stage in accordance with the present invention.

FIG. 5 is an exemplary flowchart illustrating the method of virtual circuit identifier set up for a middle stage in accordance with the present invention. In particular, the method of FIG. 5 is a further illustration of step 404 in FIG. 4. In this example, the operation starts by identifying a middle stage switching element in the interconnection network (step 502). An input link coupled to a port in the middle stage switching element is identified (step 504). Then an output link coupled to the port in the middle stage switching element is identified (step 506). A path is selected for the output of the middle stage switching element (step 508). A VCI table entry for an input port and an output port for the middle stage switching element is setup (step 510).

Next, a VCI input number of an input port associated with the middle stage switching element is assigned (step 512). A VCI number of an output port associated with the middle stage switching element assigned (step 514). A determination is then made as to whether or not another port is associated with the middle stage switching element in which a VCI number needs to be assigned (step 516). If another port is associated with the middle stage switching element in which a VCI number needs to be assigned (step 516: YES), the operation returns to step 504 in which an input link to a port in the switching element is identified.

If another port is not associated with the middle stage switching element in which a VCI number needs to be assigned (step 516: NO), a determination is then made as to whether or not there is another middle stage in the interconnection network that has not yet been identified (step 518). If there is not another middle stage in the interconnection network that has not been identified (step 518: NO), the operation terminates. If there is another middle stage in the interconnection network that has not been identified (step 518: NO), the operation returns to step 502 in which a middle stage of the interconnection network is identified.

Figure 6:
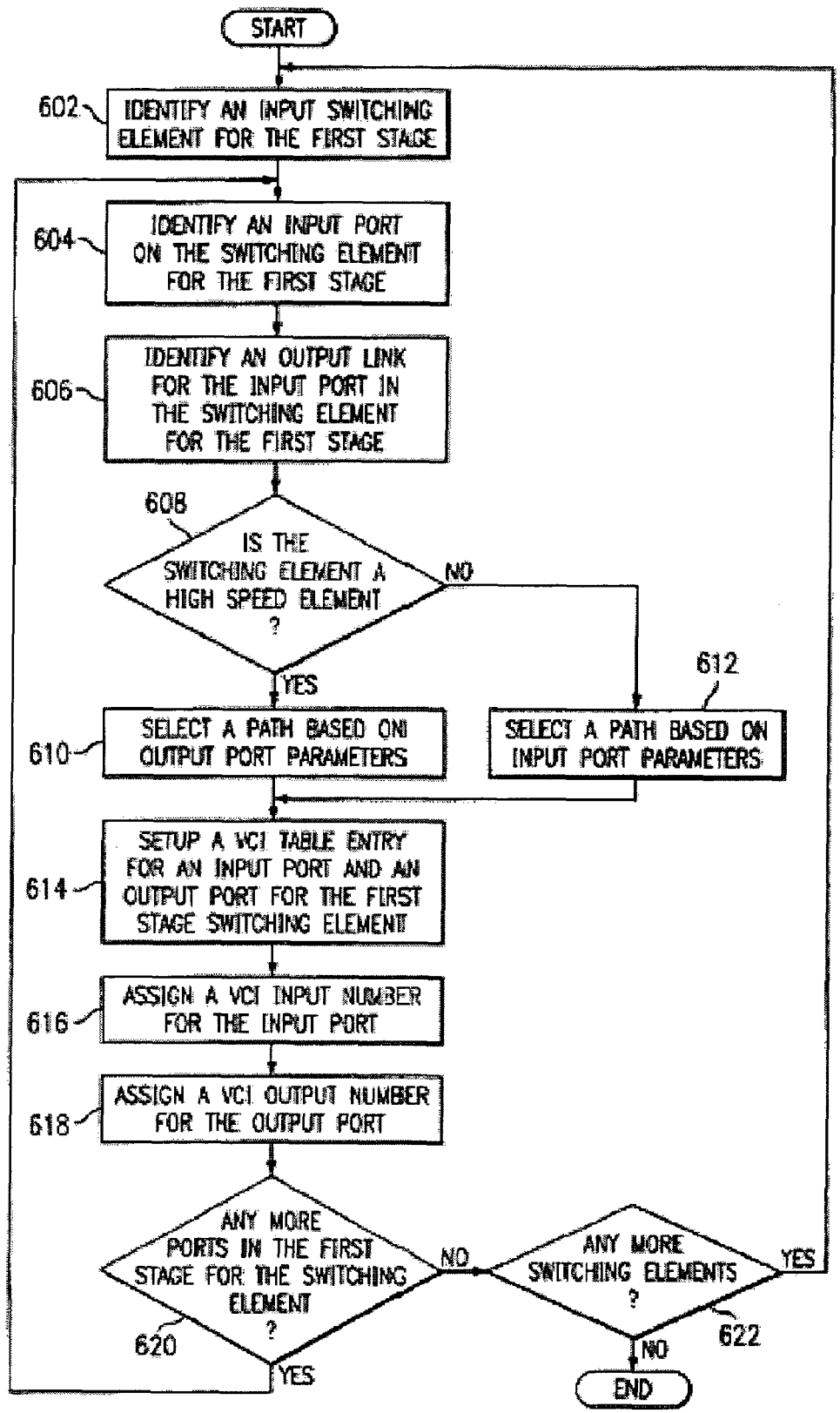
FIG. 6 is an exemplary flowchart illustrating the VCI set up for a first stage in accordance with the present invention.

FIG. 6 is an exemplary flowchart illustrating a method for virtual circuit identifier set up for a first stage in accordance with the present invention. Specifically, FIG. 6 is a further illustration of step 406 of FIG. 4. In this example, the operation starts by identifying a first stage switching element in the interconnection network (step 602). An input port on the switching element for the first stage is identified (step 604). Then an output link coupled to input port on the switching element for the first stage is identified (step 606). A determination is then made as to whether the first stage switching element is a high speed switching element (step 608). If the first stage switching element is a high speed switching element (step 608: YES), a path is selected based on output port parameters (step 610). If the first stage switching element is not a high speed switching element (step 608: NO), the path is selected based on input port parameters (step 612).

Whether the path is selected based on the input port parameters or the output port parameters, the operation then sets up a VCI table entry for an input port and an output port for the first stage switching element (step 614). A VCI input number is assigned for the input port in the VCI table (step 616). A VCI output number is assigned for the output port in the VCI table (step 618). A determination is then made as to whether or not there is another port on the first stage switching element that has not been identified (step 620). If there is not another port on the first stage switching element that has not been identified (step 620: NO), a determination is made as to whether or not there are any more switching elements in the first stage that have not been identified (step 622). If there are no more switching elements in the first stage that have not been identified (step 622: NO), the operation terminates. If there is another switching element in the first stage that has not been identified (step 622: NO), the operation returns to step 602 in which an input switching element is identified for the first stage. Returning to step 620, if there is another port on the first stage that has not been identified (step 620: YES), the operation returns to step 604 in which an input port on the first stage switching element is identified.

Figure 7:
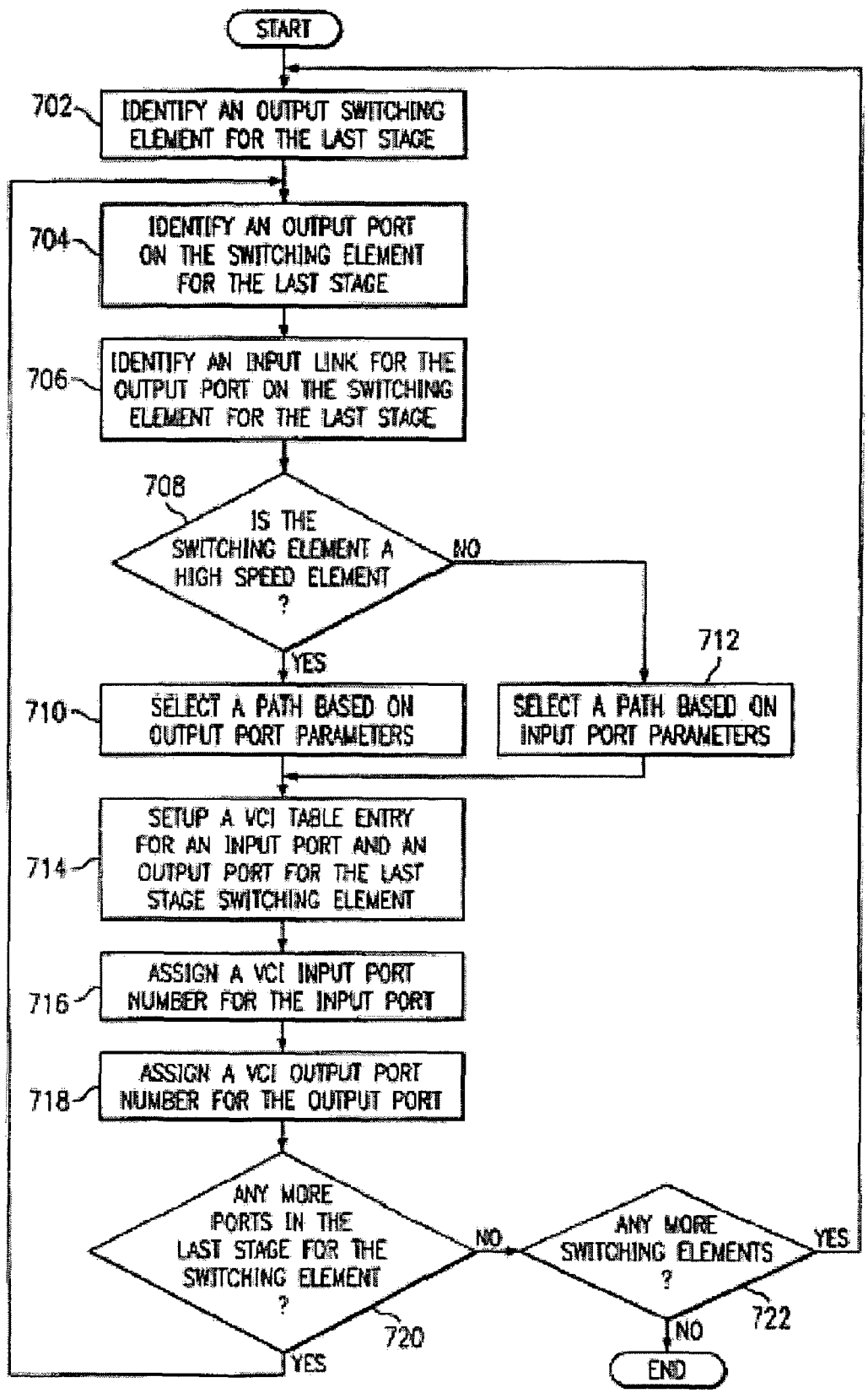
FIG. 7 is an exemplary flowchart illustrating a last stage VCI setup in accordance with the present invention.

FIG. 7 is an exemplary flowchart illustrating a method for last stage virtual circuit identifier setup in accordance with certain aspects of the present invention. FIG. 7 is a further illustration of step 408 in FIG. 4. In this example, the operation starts by identifying a last stage switching element on the interconnection network (step 702). An output port on the last stage switching element is then identified (step 704). An input link coupled to the output port on the last stage switching element is identified (step 706). A determination is then made as to whether or not the output switching element is a high speed switching element (step 708). If the output switching element is a high speed switching element (step 708: YES), a path is selected based on output port parameters (step 710). If the output switching element is not a high speed switching element (step 708: NO), the path is selected based on input port parameters (step 712).

Whether the path is selected based on input port parameters or output port parameters, the operation then sets up a VCI table entry for the last stage switching element (step 714). A VCI input port number is assigned for the input port (step 716). A VCI output port number is assigned for the output port (step 718). A determination is then made as to whether or not another port remains on the last stage switching element which has not been identified (step 720). If another port does not remain on the last stage switching element which has not been identified (step 720: NO), a determination is made as to whether or not there are any more switching elements on the last stage which have not been identified (step 722). If there are not any more switching elements on the last stage which have not been identified (step 722: NO), the operation terminates. If there are more switching elements on the last stage which have not been identified (step 722: YES), the operation returns to step 702 in which an output switching element is identified for the last stage. Returning to step 720, if there is another port on the last stage switching element which has not been identified (step 720: YES), the operation returns to step 704 in which an output port on the last stage switching element is identified.

Figure 8:
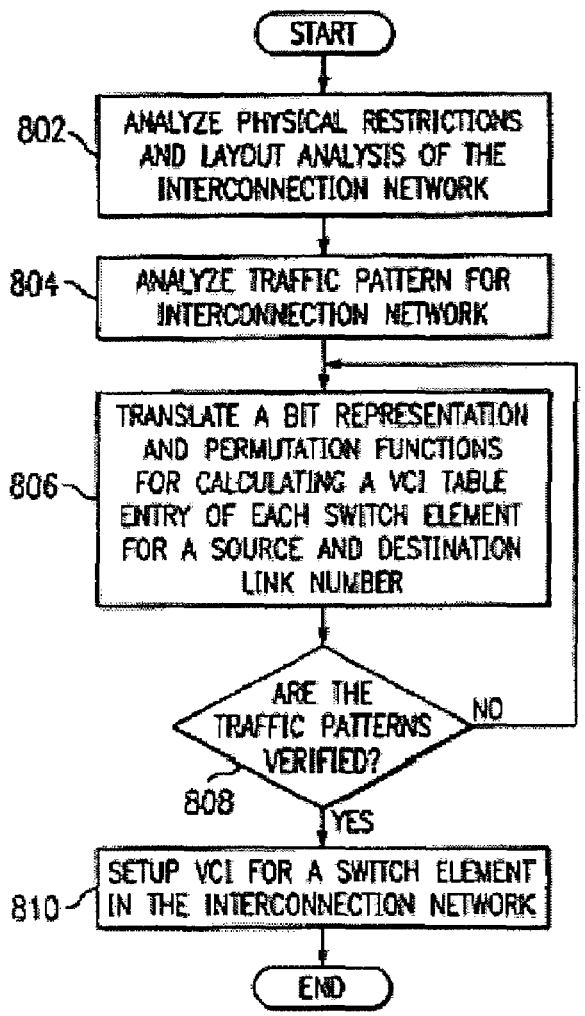
FIG. 8 is an exemplary flowchart illustrating development of a VCI allocation for different traffic requirements in accordance with the present invention.

FIG. 8 is an exemplary flowchart illustrating the method for a VCI allocation scheme that supports different traffic pattern requirements in accordance with the present invention. In this example, the operation starts with analyzing physical restrictions and layout analysis of the interconnection network (step 802). The layout analysis of the interconnection network, such as interconnection network 10, may include determining the number of switching elements and the number of links coupled to the switching elements. In one embodiment, the physical restrictions are used to arrive at a logical representation of the architecture of the interconnection network. Then a traffic pattern requirement analysis is carried out (step 804). This traffic pattern analysis is used to balance the data traffic through the links coupling the switching elements.

A bit representation and permutation functions are then translated which may dynamically calculate a specific VCI table entry of each switch element for a given source and destination link number in the interconnection network (step 806). The bit representation and permutation function may be a logical representation of the architecture of the interconnection network. A determination is made as to whether or not the different traffic requirements are verified (step 808). If the different traffic requirements are not verified (step 808: NO), the operation returns to step 806 in which a bit representation and permutation functions are translated. If the different traffic requirements are verified (step 808: YES), a switch element VCI is setup in the interconnection network (step 810) and thereafter the operation terminates. The logical representation and the traffic patterns of the interconnection network are used to setup virtual channel identifiers that determine the paths through which the data is routed. The data is routed through the switching elements and the links so that the data traffic is more evenly distributed through the interconnection network.

Additional advantages of the operation illustrated in FIG. 8 is that hot-swapping of switching elements is enabled and many features of different traffic patterns are satisfied. Hot-swapping of switching elements provides that a specific switching element may be replaced by another switching element without powering down the board to which the parts are connected or disturbing data traffic flow. With the use of the present invention, the hot-swapping of switching elements is enabled without causing any interruption in the traffic patterns. In addition, a source link number may be preserved throughout transmission of the data to the destination port. Preservation of the source link number is desired because the destination link is able to determine the source of the traffic in an easy and efficient manner.

Figure 9:
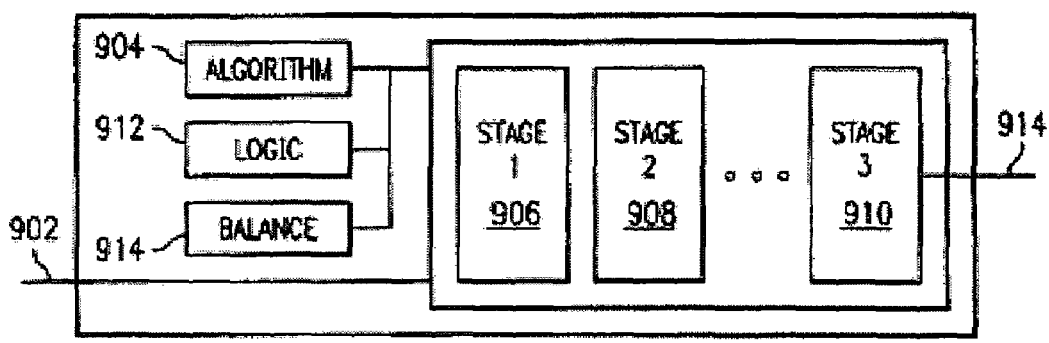
FIG. 9 is an exemplary block diagram showing the use of the present invention in an interconnection network.

FIG. 9 is an exemplary block diagram showing the use of the present invention within a switching network 900. Switching network 900 may include input 902, virtual circuit identification algorithm 904, stage 1906, stage 2908, stage n 910 and output 916. In the most general sense, switching network 900 is a system for routing data. Switching network 900 consists of a plurality of switching elements within each stage 906-910 and a plurality of links coupling both the switching elements and the stages for providing a path for routing data. Virtual circuit identification algorithm 904 is in communication with switching network 900 and provides instructions for establishing an even distribution of data traffic through switching network 900. Switching network 900 includes logic 912 for determining the physical restrictions of the network 900. In addition, switching network 900 also includes logic 914 for balancing data traffic through the plurality of links using traffic patterns of the switching network 900.

Therefore, the present invention provides a method and system in which traffic between a source link and a destination link is evenly transmitted between stages in the interconnection network so that no conflict arises between the transmission of data. By the processes of the present invention, no available pathway in the interconnection network is wasted. Data traffic is transmitted evenly along the interconnection network so that one data path does not interfere with transmission of data on another data path. Furthermore, switching elements of various speeds may be used and the data traffic aggregated or deaggregated according to the speed requirements of the switching elements. The present invention provides for a systematic and orderly allocation of data traffic without conflicts and congestion in the interconnection network.

Certain aspects of the present provides an enhancement such that no contention should happen on the bidirectional traffic path between any two ports through the switch fabric to provide full-duplex performance on the interfaces. This applies to Low Speed to Low Speed, Low Speed to High Speed, and all 8 paths between High Speed to High Speed. First stage VCI assignment of High Speed ports needs to be independent to Egress slot number, to fulfill the "load balance on stripes" implementation on High-speed boards. In the other words, Bits j3-j6 cannot be used in deciding the value of <a>, <b>, and <c> for HS paths, as in previous solutions.

Thus, the VCI paths can be use in fully duplex performance. In addition, on the fabric, traffic should be balanced among all possible paths to guarantee all DPCs have equal opportunity to be utilized. This invention also realizes the bit representation and the path selection formula for the 3-stage switch fabric.

The bit representation for the 4-stage switch fabric may be summarized as,

STATGE[0] :: first stage
  input=(i[6],i[5],i[4],i[3]):(i[2],i[1],i[0])–(j[6],j[5],j[4],j[3],j[2],j[1],j[0])
  output=(i[6],i[5],i[4],i[3]):(a, b, c)–(j[6],j[5],j[4],j[3],j[2],j[1],j[0])

STATGE[1] :: middle stage 1
  input=(i[3], a, b, c):(i[6],i[5],i[4])–(j[6],j[5],j[4],j[3],j[2],j[1],j[0])
  output=(i[3], a, b, c):(d, e, j[6])–(i[6],j[5],j[4],j[3],j[2],j[1],j[0])

STATGE[2]:: middle stage 2
  input=(c, d, e, j[6]):(i[3], a, b)–(i[6],j[5],j[4],j[3],j[2],j[1],j[0])
  output=(c, d, e, j[6]):(j[5],j[4],j[3])–(i[6],i[5],i[4],i[3],j[2],j[1],j[0])

STATGE[3] :: last stage
  input=(j[6],j[5],j[4],j[3]):(c, d, e)–(i[6],i[5],i[4],i[3],j[2],j[1],j[0])
  output=(j[6],j[5],j[4],j[3]):(j[2],j[1],j[0])–(i[6],i[5],i[4],i[3],i[2],i[1],i[0])

where each entry of the switching elements in different stages has input and output portions represented as:

|  | (4 bits) | (3 bits) | (7 bits) |
| --- | --- | --- | --- |
| Input: | Dpc # (slotnum) | Input port number (iport) | Input VCI number (ivci) |
| Output: | Dpc # (slotnum) | Output port number (oport) | Output VCI number (ovci) |

In this embodiment, the last 3 bits of VCI numbers are j[2,1,0] except the output VCI in the last stage, which is using i[2,1,0]. So, given an output slot (for a destination port) the VCI number of the traffic for that output slot will be different from the traffic to the other output slots. In addition, the output VCI number in the last stage is i, the source link number, which allows the last stage to determine which is the source link of the traffic.

Because (a, b, c, d, e) value decides one physical path, the question remains how to assign the path (a, b, c, d, e) value and how to chose the output VCI number in each stage.

As discussed previously in reference to FIG. 1a, a 4-stage switch fabric (with First stage, Middle stage1, Middle stage2, Last stage) contains 128 links (numbered 0~127). There are 64 DPCs (i.e., ATM switch). Packets encapsulated in an ATM cell form coming from one input link (source) will be designated to one output link (destination) via 4 DPCs of the 64 DPCs in the switch fabric.

Before being sent into the fabric, each packet may be encapsulated into a fabric ATM cell format (with proper padding and fragmentation.) A fabric ATM cell is similar to an ATM cell (e.g., it may have a 4-byte header and 48-byte payload). An exemplary 4-byte header is illustrated in FIG. 10. As illustrated in FIG. 10, the first four bits represents the gfc, the next 5 bits holds the vpi, and the following 11 bits holds the vci. The following four bits hold the oam, efci, eom, and clp bits respectively.

For this illustrative example, the VCI field will be used to forward the traffic inside the router fabric based on the VCI value. This VCI field may be used by each fabric stage to decide where (e.g., which DPC output port) to send the cell next. Although each physical link in this illustrative example could carry 16-bit ($2^{16}$) VCI numbers, this discussion will use 7-bit VCI numbers for the sake of simplicity.

When a packet cell reaches the DPC of each stage, the DPC will perform a table lookup (on its pre-populated switch table), based on the input port number and the input VCI number of this packet, to decide which output port to direct this packet cell to the next stage DPC, and which new output VCI to put on the packet cell header for the next stage DPC. Note that in this embodiment, the DPC number (0~15, i.e., slot number) and the port number (0~7) on a specific DPC can be derived from a link number (0~127). For the packet traverse from input link i to the output link j, in the First Stage DPC, the packet may carry the output link j (destination) as its input vci number in its ATM header so its destination may be determined. In the Last Stage DPC, the traverse packet carries the input link i (source) as its output VCI number, so that its source may be determined.

The discussion below illustrates embodiments of an algorithm to populate the switch table in each DPC (at all the stages) such that certain traffic requirements can be satisfied by the DPC forwarding the traffic via the table lookup.

Figure 11:
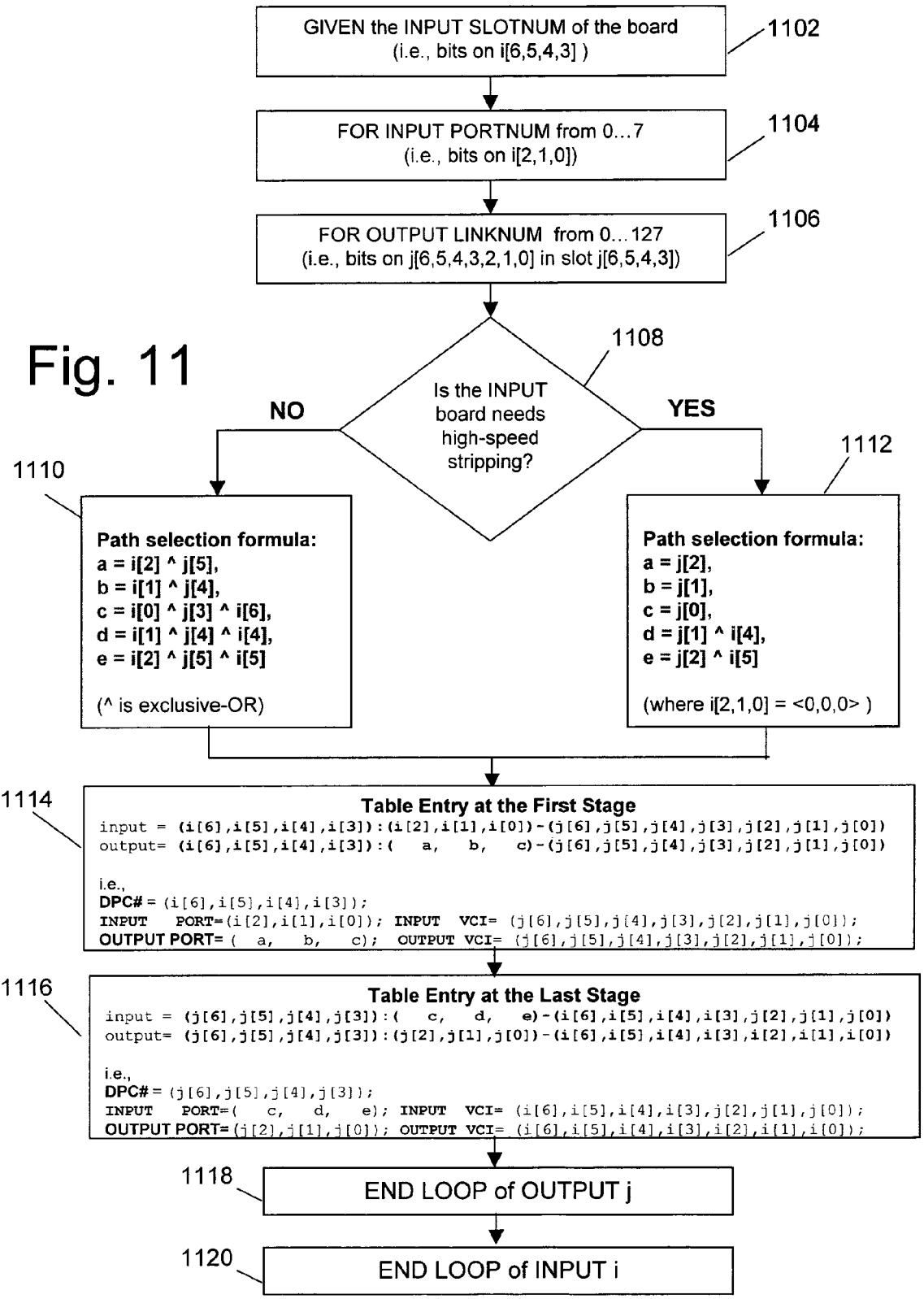

Turning now to FIG. 11, there is presented a First-stage and Last stage DPC setup for populating a VCI table which may be used in an exemplary four stage switch fabric, such as one illustrated in FIG. 1a. (The Middle stage DPC setup will be discussed in reference to FIG. 12.) For the exemplary 4-stage switch fabric, the discussion will use a 7-bit link number (0~127) to represent the input (src) and output (dst) links. In other words, the DPC paths setup are for the traffic sent from link i[6,5,4,3,2,1,0] to output link j[6,5,4,3,2,1,0]. Under this scenario, there are 128×128 possible combinations of the input and output links.

FIG. 11, therefore, illustrates an exemplary process which calculates the VCI entries and populates the table entries (i.e., 128×128 entries in each DPC) for the First and Last stage DPCs. In this embodiment, the various table entries are populated using a series of nested loops. Step 1102 represents the start of a first loop (or loop i) which performs a process to populate a table for each DPC in the first and last stages (i.e., with slot number 0~15). Step 1104 represents the start of a nested loop which performs a process on each input port number (0~7). Similarly, step 1106 represents the start of a nested loop which performs a process on each output link number (0~127).

In step 1108, the process determines if the DPC in question is on a high speed board that performs traffic stripping. If no, then the process flows to step 1110. On the other hand, if the DPC in question is on a high speed board that performs traffic stripping, then the process flows to step 1112. Steps 1110 and 1112 calculate the path selection value (a, b, c, d, e), where a, b, c, d, and e are only binary bit (0 or 1). the path selection value (a, b, c, d, e) also decide which DPCs to use during the virtual circuit path from the First Stage input to the Last Stage output.

Step 1110 calculates the path selection formula for a normal board. In this calculation, the first stage DPC output port number (i.e., a, b, c) is chosen by the value of the input port number (i[2], i[1], i[0]) exclusive OR on the 3 bits of the Last Stage output DPC slot number (j[5], j[4], j[3]) and one bit of the input DPC slot number (j[6]). Furthermore, (c, d, e) which decides the Middle stage DPC output port (and which DPC) and also the Last stage DPC input port number is chosen by the exclusive OR on the First Stage DPC input port number reversed (i[0], i[1], i[2]) with the partial input DPC slot number bits (i[6], i[4], i[5]) and the Last Stage output DPC slot number bits (j[3], j[4], j[5]). The path selection formula would then be:

$$a = i[2] \hat{} j[5],$$

$$b = i[1] \hat{} j[4],$$

$$c = i[0] \hat{} j[3] \hat{} i[6],$$

$$d = i[1] \hat{} j[4] \hat{} i[4],$$

$$e = i[2] \hat{} j[5] \hat{} i[5]$$

where $\hat{}$ is exclusive-OR.

Step 1112, on the other hand, calculates the path selection formula for a high speed board with stripping. In this situation, the high speed board only has one input port i=0 (i.e., i[2]=0, i[1]=0, i[0]=0) for a given DPC. Thus, the Last Stage output DPC port number can be used to decide (a, b, c); and (c, d, e) is exclusive OR on the Last stage DPC output port number reversed (j[0], j[1], j[2]) with the partial of input DPC slot number (i[4], i[5]). The path selection formula would then be:

$$a = j[2],$$

$$b = j[1],$$

$$c = j[0],$$

$$d = j[1] \hat{} i[4],$$

$$e = j[2] \hat{} i[5]$$

where i[2,1,0]=<0,0,0>

Once the path selection formulas are calculated in either step 1110 or 1112, the table entry values on the given First Stage DPC number may then be determined and populated in step 1114. As illustrated in FIG. 11, the input port value for a given First Stage DPC number may be determined by:

input=(i[6],i[5],i[4],i[3]):(i[2],i[1],i[0])-(j[6],j[5],j[4],j[3],j[2],j[1],j[0])

Similarly, the output port value may for a given First Stage DPC number be calculated as:

output=(i[6],i[5],i[4],i[3]):(a, b, c)-(j[6],j[5],j[4],j[3],j[2],j[1],j[0])

In other words:

DPC#=(i[6],i[5],i[4],i[3]);

INPUT PORT=(i[2],i[1],i[0]); INPUT VCI=(j[6],j[5],j[4],j[3],j[2],j[1],j[0]);

OUTPUT PORT=(a, b, c); OUTPUT VCI=(j[6],j[5],j[4],j[3],j[2],j[1],j[0])

In step 1116, the table entry values on the given Last Stage DPC number may then be determined and populated. As illustrated in FIG. 11, the input port for a given Last Stage DPC number may be determined by:

input =(j[6],j[5],j[4],j[3]):(c, d, e)−(i[6],i[5],i[4],i[3],j[2],j[1],j[0])

Similarly, the output port may for a given Last Stage DPC number be calculated as:

output=(j[6],j[5],j[4],j[3]):(j[2],j[1],j[0])−(i[6],i[5],i[4],i[3],i[2],i[1],i[0])

In other words:

DPC#=(j[6],j[5],j[4],j[3]);

INPUT PORT=(c, d, e); INPUT VCI=(i[6],i[5],i[4],i[3],j[2],j[1],j[0]);

OUTPUT PORT=(j[2],j[1],j[0]);

OUTPUT VCI=(i[6],i[5],i[4],i[3],i[2],i[1],i[0])

Step 1118 signals the end of the loop which began in step 1106. Similarly, step 1120 represents the end of the loop which began in step 1102.

Figure 12:
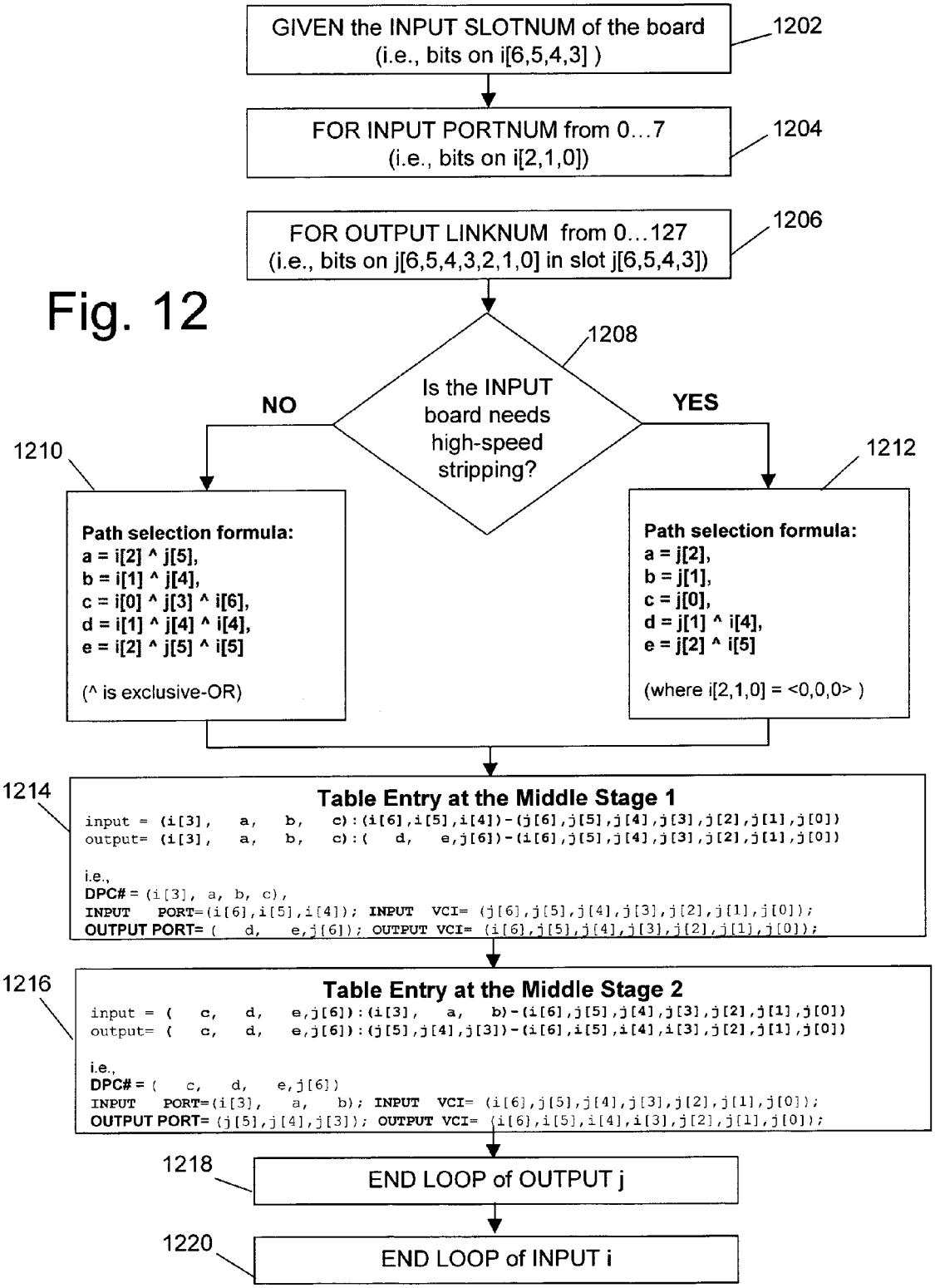

FIG. 12 illustrates an exemplary process which calculates the VCI entries and populates the table entries (i.e., 128×128 entries in each DPC) for the first and second middle stage DPCs. In this embodiment, the various table entries are populated using a series of nested loops. Step 1202 represents the start of a first loop (or loop i) which performs a process to populate a table for each DPC in the first and last stages (i.e., with slot number 0~15). Step 1204 represents the start of a nested loop which performs a process on each input port number (0~7). Similarly, step 1206 represents the start of a nested loop which performs a process on each output link number (0~127).

In step 1208, the process determines if the DPC in question is on a high speed board that performs traffic stripping. If no, then the process flows to step 1210. On the other hand, if the DPC in question is on a high speed board that performs traffic stripping, then the process flows to step 1212. Steps 1210 and 1212 calculate the path selection value (a, b, c, d, e), where a, b, c, d, and e are only binary bit (0 or 1).

In step 1210, the path selection formula is calculated using the path selection formula for a normal board as previously described in reference to step 1110 of the process illustrated FIG. 11. So, the path selection formula would then be:

a=i[2]^j[5], b=i[1]^j[4], c=i[0]^j[3]^i[6], d=i[1]^j[4]^i[4], e=i[2]^j[5]^i[5]

where ^ is exclusive-OR.

Similarly, step 1212, on the other hand, calculates the path selection formula for a high speed board with stripping as described previously in reference to step 1110. So, the path selection formula would then be:

a=j[2], b=j[1], c=j[0], d=j[1]^i[4], e=j[2]^i[5]

where i[2,1,0]=<0,0,0>

Once the path selection formulas are calculated in either step 1210 or 1212, the table entry values on the given first Middle Stage DPC number may then be determined and populated in step 1214. As illustrated in FIG. 12, the input port for a given first Middle Stage DPC number may be determined by:

input=(i[3], a, b, c):(i[6],i[5],i[4])−(j[6],j[5],j[4],j[3],j[2],j[1],j[0])

Similarly, the output port may for a given First Stage DPC number be calculated as:

output=(i[3], a, b, c):(d, e, j[6])−(i[6],j[5],j[4],j[3],j[2],j[1],j[0])

In other words:

DPC#=(i[3], a, b, c),

INPUT PORT=(i[6],i[5],i[4]); INPUT VCI=(j[6],j[5],j[4],j[3],j[2],j[1],j[0]);

OUTPUT PORT=(d, e, j[6]); OUTPUT VCI=(i[6],j[5],j[4],j[3],j[2],j[1],j[0])

In step 1216, the table entry values on the given second Middle Stage DPC number may then be determined and populated. As illustrated in FIG. 12, the input port for a given second Middle stage DPC number may be determined by:

input=(c, d, e, j[6]):(i[3], a, b)−(i[6],j[5],j[4],j[3],j[2],j[1],j[0])

Similarly, the output port may for a given Last Stage DPC number be calculated as:

output=(c, d, e, j[6]):(j[5],j[4],j[3])−(i[6],i[5],i[4],i[3],j[2],j[1],j[0])

In other words:

DPC#=(c, d, e, j[6])

INPUT PORT=(i[3], a, b); INPUT VCI=(i[6],j[5],j[4],j[3],j[2],j[1],j[0]);

OUTPUT PORT=(j[5],j[4],j[3]);

OUTPUT VCI=(i[6],i[5],i[4],i[3],j[2],j[1],j[0])

Step 1218 signals the end of the loop which began in step 1206. Similarly, step 1220 represents the end of the loop which began in step 1202.

For the 3-stage switch fabric as shown in FIG. 1d, because each DPC on the first stage are connected to all the DPCs on the second stages, there are fewer restrictions on the bit representation.; In this embodiment, The output port number of the first stage DPC is used to determine the DPC number of the second stage, and only (a, b, c) are used to select the physical paths. The bit representation may then be:
STATGE[0]:: first stage
input=(i[5],i[4],i[3]):(i[2],i[1],i[0])−(j[5],j[4],j[3],j[2],j[1],j[0])
output=(i[5],i[4],i[3]):(a, b, c)−(j[5],j[4],j[3],j[2],j[1],j[0])
STATGE[1]:: middle stage 1
input=(a, b, c):(i[5],i[4],i[3])−(j[5],j[4],j[3],j[2],j[1],j[0])
output=(a, b, c):(j[5],j[4],j[3])−(i[5],i[4],i[3],j[2],j[1],j[0])
STATGE[2]:: last stage
input=(j[5],j[4],j[3]):(a, b, c)−(i[5],i[4],i[3],j[2],j[1],j[0])
output=(j[5],j[4],j[3]):(j[2],j[1],j[0])−(i[5],i[4],i[3],i[2],i[1],i[0])

Figure 13:
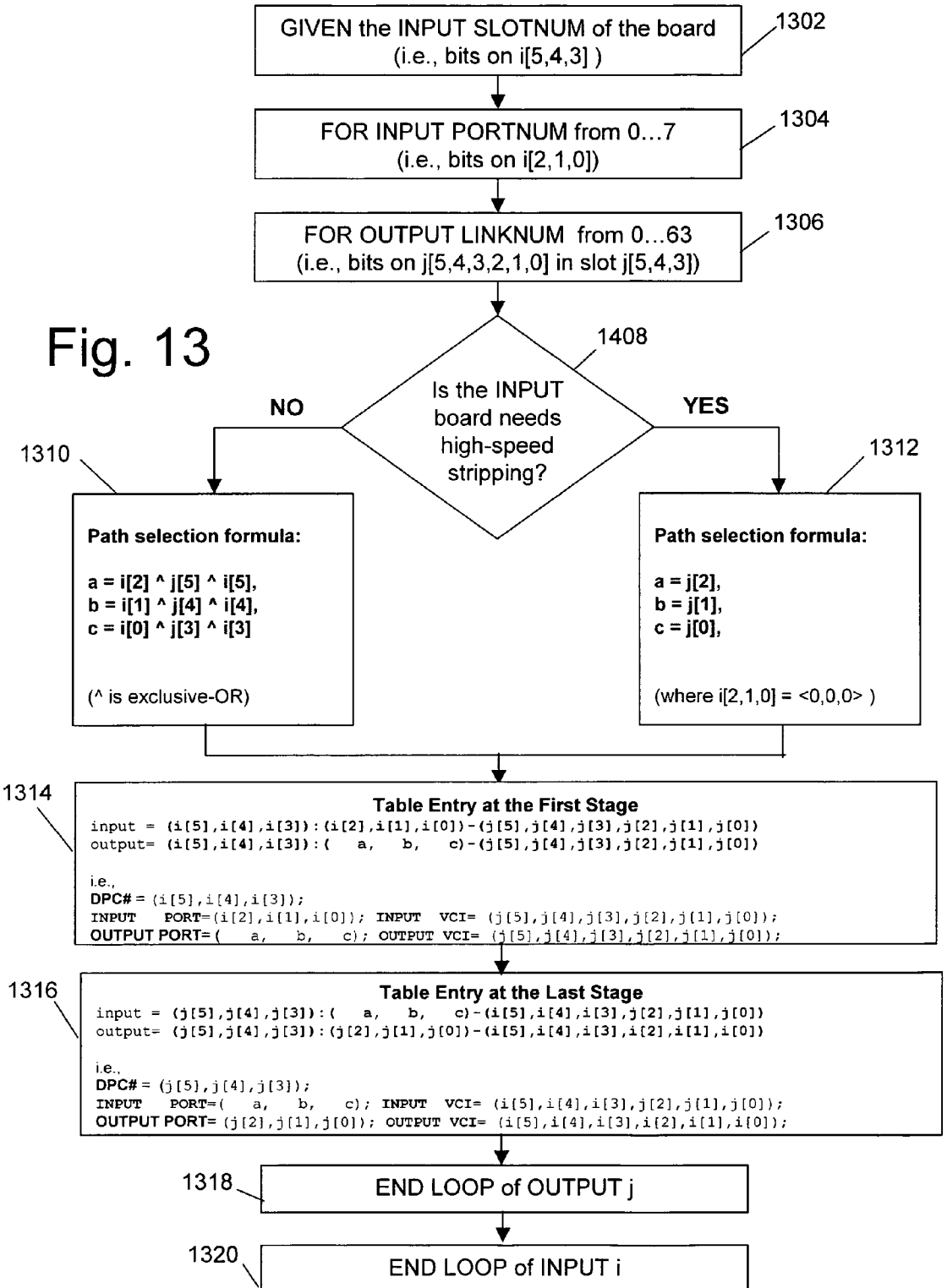
FIG. 13 illustrates a process for populating first and last stage table entries of an exemplary 3-stage interconnection network.

Turning now to FIG. 13, there is presented a First-stage and Last stage DPC setup for a three stage switch fabric. (The Middle stage DPC setup will be discussed in reference to FIG.

14. For the 3-stage switch fabric used in FIG. 13, the discussion will use a 6-bit link number to represent the input (src) and output (dst) links or ports. In other words, the DPC paths setup are for the traffic sent from i[5,4,3,2,1,0] to output link j[5,4,3,2,1,0]. Under this scenario, there are 64×64 possible combinations of the input and output ports.

FIG. 13, therefore, illustrates an exemplary process which calculates the VCI entries and populates the table entries (i.e., 64×64 entries in each DPC) for the First and Last stage DPCs. In this embodiment, the various table entries are populated using a series of nested loops. Step 1302 represents the start of a first loop (or loop i) which performs a process to populate a table for each DPC in the first and last stages (i.e., with slot number 0~15). Step 1304 represents the start of a nested loop which performs a process on each input port number (0~7). Similarly, step 1306 represents the start of a nested loop which performs a process on each output link number (0~64).

In step 1308, the process determines if the DPC in question is on a high speed board that performs traffic stripping. If no, then the process flows to step 1310. On the other hand, if the DPC in question is on a high speed board that performs traffic stripping, then the process flows to step 1312. Steps 1310 and 1312 calculate the path selection value (a, b, c).

Step 1310 calculates the path selection formula for a normal board. Because any First Stage DPC can physically reach any Middle Stage DPC, we may have to increase the permutation distribution by using the exclusive OR on the input port number (i[2], i[1], i[0]) with all the input and output slot numbers (i[5, 4, 3] and j[5, 4, 3]). That is, the path selection formula would then be:

$a = i[2] \hat{}\, j[5] \hat{}\, i[5]$, $b = i[1] \hat{}\, j[4] \hat{}\, i[4]$, $c = i[0] \hat{}\, j[3] \hat{}\, i[3]$ where $\hat{}$ is exclusive-OR.

Step 1312, on the other hand, calculates the path selection formula for a high-speed board with stripping. In this situation, the high speed board only has one input port i=0 (i.e., i[2]=0, i[1]=0, i[0]=0) for a given DPC. Thus, the Last Stage output port number can be used to decide (a, b, c) which is the First Stage output port (and thus also determine the Middle Stage DPC). The path selection formula would then be:

$a = j[2]$, $b = j[1]$, $c = j[0]$, where i[2,1,0]=<0,0,0>

Once the path selection formulas are calculated in either step 1310 or 1312, the table entry values on the given First Stage DPC number may then be determined and populated in step 1314. As illustrated in FIG. 13, the input port for a given First Stage DPC number may be determined by:

input=(i[5],i[4], i[3]):(i[2],i[1],i[0])-(j[5],j[4],j[3],j[2],j[1],j[0])

Similarly, the output port may for a given First Stage DPC number be calculated as:

output=(i[5],i[4],i[3]):(a, b, c)-(j[5],j[4],j[3],j[2],j[1],j[0])

In other words:

DPC#=(i[5],i[4],i[3]);

INPUT PORT=(i[2],i[1],i[0]); INPUT VCI=(j[5],j[4],j[3],j[2],j[1],j[0]);

OUTPUT PORT=(a, b, c); OUTPUT VCI=(j[5],j[4],j[3],j[2],j[1],j[0])

In step 1316, the table entry values on the given Last Stage DPC number may then be determined and populated. As illustrated in FIG. 13, the input port for a given Last Stage DPC number may be determined by:

input=(j[5],j[4],j[3]):(a, b, c)-(i[5],i[4],i[3],j[2],j[1],j[0])

Similarly, the output port may for a given Last Stage DPC number be calculated as:

output=(j[5],j[4],j[3]):(j[2],j[1],j[0])-(i[5],i[4],i[3],i[2],i[1],i[0])

In other words:

DPC#=(j[5],j[4],j[3]);

INPUT PORT=(a, b, c); INPUT VCI=(i[5],i[4],i[3],j[2],j[1],j[0]);

OUTPUT PORT=(j[2],j[1],j[0]); OUTPUT VCI=(i[5],i[4],i[3],i[2],i[1],i[0])

Step 1318 signals the end of the loop which began in step 1306. Similarly, step 1320 represents the end of the loop which began in step 1302.

Figure 14:
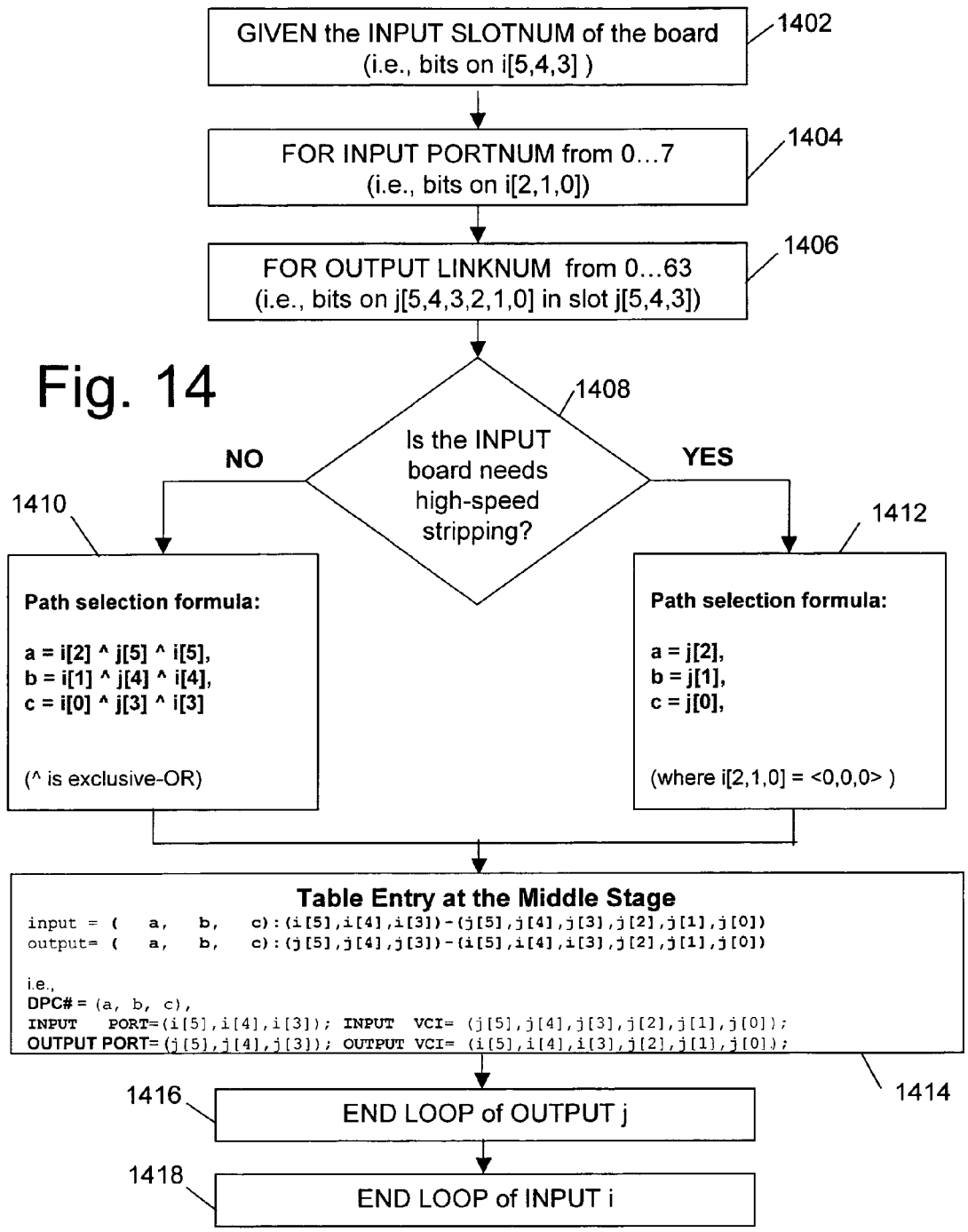
FIG. 14 illustrates a process for populating the middle stage table entries for an exemplary 3-stage interconnection network.

FIG. 14 illustrates an exemplary process which calculates the VCI entries and populates the table entries (i.e., 64×64 entries in each DPC) for the middle stage DPCs of the exemplary 3-stage fabric switch. In this embodiment, the various table entries are populated using a series of nested loops. Step 1402 represents the start of a first loop (or loop i) which performs the process for each DPC in the middle stage (i.e., with slot number 0~15). Step 1404 represents the start of a nested loop which performs a process on each input port number (0~7). Similarly, step 1406 represents the start of a nested loop which performs a process on each output link number (0~63).

In step 1408, the process determines if the DPC in question is on a high speed board that performs traffic stripping. If no, then the process flows to step 1410. On the other hand, if the DPC in question is on a high speed board that performs traffic stripping, then the process flows to step 1412. Steps 1410 and 1412 calculate the path selection value (a, b, c).

Step 1410 calculates the table entries at the Middle Stage DPCs of a normal board by using the same path selection formula as in Step 1310 so that the DPC setup in these three stage elements can be matched and form good VCI paths. The path selection formula would then be:

$a = i[2] \hat{}\, j[5] \hat{}\, i[5]$, $b = i[1] \hat{}\, j[4] \hat{}\, i[4]$, $c = i[0] \hat{}\, j[5] \hat{}\, i[3]$ where $\hat{}$ is exclusive-OR.

Step 1412, similarly, calculates the table entries by using the same path selection formula as in Step 1312 for a high-speed board with stripping. The path selection formula would then be:

$a = j[2]$, $b = j[1]$, $c = j[0]$, where i[2,1,0]=<0,0,0>

Once the path selection formulas are calculated in either step 1410 or 1412, the table entry values on the given Middle Stage DPC number may then be determined and populated in step 1415. As illustrated in FIG. 14, the input port for a given Middle Stage DPC number may be determined by:

input=(a, b, c):(i[5],i[4],i[3])–(j[5],j[4],j[3],j[2],j[1],j[0])

Similarly, the output port may be calculated as:

output=(a, b, c):(j[5],j[4],j[3])–(i[5],i[4],i[3],j[2],j[1],j[0])

In other words:

DPC#=(a, b, c),

INPUT PORT=(i[5],i[4],i[3]); INPUT VCI=(j[5],j[4],j[3],j[2],j[1],j[0]);

OUTPUT PORT=(j[5],j[4],j[3]); OUTPUT VCI=(i[5],i[4],i[3],j[2],j[1],j[0])

Step 1416 signals the end of the loop which began in step 1406. Similarly, step 1418 represents the end of the loop which began in step 1402.

The embodiments shown and described above are only exemplary. Even though numerous characteristics and advantages of the present inventions have been set forth in the foregoing description, together with details of the structure and function of the invention, the disclosure is illustrative only, and changes may be made within the principles of the invention to the full extent indicated by the broad general meaning of the terms used in the attached claims.

What is claimed is:

1. A method of assigning paths through an interconnection network consisting of a plurality of switching elements and a plurality of links coupling the switching elements, the method comprising the steps of:

using physical restrictions of the interconnection network to arrive at a logical representation of an architecture of the interconnection network;

determining traffic patterns of the interconnection network to balance the data traffic through the links coupling the switching elements;

using the logical representation and traffic patterns of the interconnection network to setup a virtual circuit identifier table that represent path selection formulas so that duplex data traffic is more evenly distributed through the interconnection network; and determining, based on packet header information, whether a data path controller, which will be using the virtual circuit identifier table, is on a high speed board that performs traffic stripping or on a low speed board;

wherein the switching elements are arranged in rows and columns, and each column represents a stage, wherein the interconnection network includes four stages; and wherein if the data path controller is not on a high speed board that performs traffic stripping, then the path selection formula as:

$a=i[2]\hat{\ }j[5]$, $b=i[1]\hat{\ }j[4]$, $c=i[0]\hat{\ }j[3]\hat{\ }i[6]$, $d=i[1]\hat{\ }j[4]\hat{\ }i[4]$, $e=i[2]\hat{\ }j[5]\hat{\ }i[5]$ $\hat{\ }$ is an exclusive OR;
a, b, c, d, e are binary bits (0 or 1) defining a path selection value;

i is an input link number in a first-stage switching element, wherein i[x] is a binary bit and [x] represents a bit position selected from possible bit positions (0 to 6); and j is an output link number in a last-stage switching element, wherein j[y] is a binary bit and [y] represents a bit position selection from seven possible bit positions (0 to 6).

2. A method of assigning paths through an interconnection network consisting of a plurality of switching elements and a plurality of links coupling the switching elements, the method comprising the steps of:

using physical restrictions of the interconnection network to arrive at a logical representation of an architecture of the interconnection network;

determining traffic patterns of the interconnection network to balance the data traffic through the links coupling the switching elements;

using the logical representation and traffic patterns of the interconnection network to setup a virtual circuit identifier table that represent path selection formulas so that duplex data traffic is more evenly distributed through the interconnection network; and determining, based on packet header information, whether a data path controller, which will be using the virtual circuit identifier table, is on a high speed board that performs traffic stripping or on a low speed board;

wherein the switching elements are arranged in rows and columns, and each column represents a stage, wherein the interconnection network includes four stages; and wherein if the data path controller is on a high speed board that performs traffic stripping, then setting the path selection formula as:

$a=j[2]$, $b=j[1]$, $c=j[0]$, $d=j[1]\hat{\ }i[4]$, $e=j[2]\hat{\ }i[5]$, $\hat{\ }$ is an exclusive OR;
a, b, c, d, e are binary bits (0 or 1) defining a path selection value;

i is an input link number in a first-stage switching element, wherein i[x] is a binary bit and [x] represents a bit position selected from possible bit positions (0 to 6); and j is an output link number in a last-stage switching element, wherein j[y] is a binary bit and [y] represents a bit position selection from seven possible bit positions(0 to 6); and

[2,1,0]=<0,0,0>.

3. A method of assigning paths through an interconnection network consisting of a plurality of switching elements and a plurality of links coupling the switching elements, the method comprising the steps of:

using physical restrictions of the interconnection network to arrive at a logical representation of an architecture of the interconnection network;

determining traffic patterns of the interconnection network to balance the data traffic through the links coupling the switching elements;

using the logical representation and traffic patterns of the interconnection network to setup a virtual circuit identifier table that represent path selection formulas so that duplex data traffic is more evenly distributed through the interconnection network; and determining, based on packet header information, whether a data path controller, which will be using the virtual circuit identifier table, is on a high speed board that performs traffic stripping or on a low speed board;

wherein the switching elements are arranged in rows and columns, and each column represents a stage, wherein the interconnection network includes three stages; and wherein if the data path controller is not on a high speed board that performs traffic stripping, then setting the path selection formula as:

$a = i[2] \char`\^ j[5] \char`\^ i[5]$, $b = i[1] \char`\^ j[4] \char`\^ i[4]$, $c = i[0] \char`\^ j[5] \char`\^ i[3]$, $\char`\^$ is an exclusive OR;

a, b, c are binary bits (0 or 1) defining a path selection value;

i is an input link number in a first-stage switching element, wherein i[x] is a binary bit and [x] represents a bit position selected from six possible bit positions (0 to 5); and j is an output link number in a last-stage switching element, j[y] is a binary bit and [y] represents a bit position selected from six possible bit positions (0 to 5).

4. A method of assigning paths through an interconnection network consisting of a plurality of switching elements and a plurality of links coupling the switching elements, the method comprising the steps of:

using physical restrictions of the interconnection network to arrive at a logical representation of an architecture of the interconnection network;

determining traffic patterns of the interconnection network to balance the data traffic through the links coupling the switching elements;

using the logical representation and traffic patterns of the interconnection network to setup a virtual circuit identifier table that represent path selection formulas so that duplex data traffic is more evenly distributed through the interconnection network; and determining, based on packet header information, whether a data path controller, which will be using the virtual circuit identifier table, is on a high speed board that performs traffic stripping or on a low speed board;

wherein the switching elements are arranged in rows and columns, and each column represents a stage, wherein the interconnection network includes three stages; and wherein if the data path controller is on a high speed board that performs traffic stripping, then setting the path selection formula as:

$a = j[2]$, $b = j[1]$, $c = j[0]$, $\char`\^$ is an exclusive OR;

a, b, c, are binary bits (0 or 1) defining a path selection value;

i is an input link number in a first-stage switching element, wherein i[x] is a binary bit and [x] represents a bit position selected from six possible bit positions (0 to 5); and j is an output link number in a last-stage switching element, wherein j[y] is a binary bit and [y] represents a bit position selected from six possible bit positions (0 to 5); and $i[2,1,0] = <0,0,0>$.

5. A system for routing data, comprising:

a switching node, including a plurality of switching elements and plurality of links coupled to the switching elements for providing a routing path for the data;

a virtual circuit identification algorithm in communication with the switching node for providing an even distribution of data traffic through the switching node, wherein the virtual circuit identification algorithm determines a path selection formula used to populate a virtual circuit identifier table; and means for determining, based on packet header information, whether a data path controller which will be using the virtual circuit identifier table is on a high speed board that performs traffic stripping or a low speed boards;

wherein the switching elements are arranged in rows and columns, and each column represents a stage, wherein the switching node includes four stages; and wherein if the data path controller is not on a high speed board that performs traffic stripping, then setting the path selection formula as:

$a = i[2] \char`\^ j[5]$, $b = i[1] \char`\^ j[4]$, $c = i[0] \char`\^ j[3] \char`\^ i[6]$, $d = i[1] \char`\^ j[4] \char`\^ i[4]$, $e = i[2] \char`\^ j[5] \char`\^ i[5]$, $\char`\^$ is an exclusive OR;

a, b, c, d, e are binary bits (0 or 1) defining a path selection value;

i is an input link number in a first-stage switching element, wherein i[x] is a binary bit and [x] represents a bit position selected from possible bit positions (0 to 6); and j is an output link number in a last-stage switching element, wherein j[y] is a binary bit and [y] represents a bit position selection from seven possible bit positions (0 to 6).

6. A system for routing data, comprising:

a switching node, including a plurality of switching elements and plurality of links coupled to the switching elements for providing a routing path for the data;

a virtual circuit identification algorithm in communication with the switching node for providing an even distribution of data traffic through the switching node, wherein the virtual circuit identification algorithm determines a path selection formula used to populate a virtual circuit identifier table; and means for determining, based on packet header information, whether a data path controller which will be using the virtual circuit identifier table is on a high speed board that performs traffic stripping or a low speed board;

wherein the switching elements are arranged in rows and columns, and each column represents a stage, wherein the switching node includes four stages; and wherein if the data path controller is on a high speed board that performs traffic stripping, then selling the path selection formula as:

$a = j[2]$, $b = j[1]$, $c = j[0]$, $d = j[1]\,\hat{}\,i[4]$, $e = j[2]\,\hat{}\,i[5]$, $\hat{}$ is an exclusive OR;

a, b, c, d, e are binary bits (0 or 1) defining a path selection value;

i is an input link number in a first-stage switching element, wherein i[x] is a binary bit and [x] represents a bit position selected from possible bit positions (0 to 6); and j is an output link number in a last-stage switching element, wherein j[y] is a binary bit and [y] represents a bit position selection from seven possible bit positions (0 to 6); and $i[2,1,0] = <0,0,0>$.

7. A system for routing data, comprising:

a switching node, including a plurality of switching elements and plurality of links coupled to the switching elements for providing a routing path for the data;

a virtual circuit identification algorithm in communication with the switching node for providing an even distribution of data traffic through the switching node, wherein the virtual circuit identification algorithm determines a path selection formula used to populate a virtual circuit identifier table; and means for determining, based on packet header information, whether a data path controller which will be using the virtual circuit identifier table is on a high speed board that performs traffic stripping or a low speed board;

wherein the switching elements are arranged in rows and columns, and each column represents a stage, wherein the switching node includes three stages; and wherein if the data path controller is not on a high speed board that performs traffic stripping, then setting the path selection formula as:

$a = i[2]\,\hat{}\,j[5]\,\hat{}\,i[5]$, $d = i[1]\,\hat{}\,j[4]\,\hat{}\,i[4]$, $c = i[0]\,\hat{}\,j[5]\,\hat{}\,i[3]$, $\hat{}$ is an exclusive OR;

a, b, c are binary bits (0 or 1) defining a path selection value;

i is an input link number in a first-stage switching element, wherein i[x] is a binary bit and [x] represents a bit position selected from six possible bit positions (0 to 5); and j is an output link number in a last-stage switching element, wherein j[y] is a binary bit and [y] represents a bit position selected from six possible bit positions (0 to 5).

8. A system for routing data, comprising:

a switching node, including a plurality of switching elements and plurality of links coupled to the switching elements for providing a routing path for the data;

a virtual circuit identification algorithm in communication with the switching node for providing an even distribution of data traffic through the switching node, wherein the virtual circuit identification algorithm determines a path selection formula used to populate a virtual circuit identifier table; and means for determining, based on packet header information, whether a data path controller which will be using the virtual circuit identifier table is on a high speed board that performs traffic stripping or a low speed board;

wherein the switching elements are arranged in rows and columns, and each column represents a stage, wherein the switching node includes three stages; and wherein if the data path controller is on a high speed board that performs traffic stripping, then setting the path selection formula as:

$a = j[2]$, $b = j[1]$, $c = j[0]$, $\hat{}$ is an exclusive OR;

a, b, c, are binary bits (0 or 1) defining a path selection value;

i is an input link number in a first-stage switching element, wherein i[x] is a binary bit and [x] represents a bit position selected from six possible bit positions (0 to 5); and j is an output link number in a last-stage switching element, wherein j[y] is a binary bit and [y] represents a bit position selected from six possible bit positions (0 to 5); and $i[2,1,0] = <0,0,0>$.

* * * * *